US012763724B2

(12) United States Patent
Greulich et al.

(10) Patent No.: US 12,763,724 B2
(45) Date of Patent: Oct. 13, 2026

(54) METHOD AND DEVICE FOR ASSESSING THE QUALITY OF A SOLAR CELL

(71) Applicant: Fraunhofer-Gesellschaft zur Förderung der angewandten Forschung e.V., Munich (DE)

(72) Inventors: Johannes Greulich, Freiburg (DE); Hannes Höffler, Freiburg (DE); Nico Wöhrle, Freiburg (DE); Matthias Demant, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 776 days.

(21) Appl. No.: 18/267,498

(22) PCT Filed: Dec. 15, 2021

(86) PCT No.: PCT/EP2021/085893

§ 371 (c)(1),
(2) Date: Feb. 6, 2024

(87) PCT Pub. No.: WO2022/129172

PCT Pub. Date: Jun. 23, 2022

(65) Prior Publication Data

US 2024/0195357 A1 Jun. 13, 2024

(30) Foreign Application Priority Data

Dec. 16, 2020 (DE) ......................... 102020133701.9

(51) Int. Cl.
*H02S 50/15* (2014.01)
*G01N 21/66* (2006.01)

(52) U.S. Cl.
CPC ............ *H02S 50/15* (2014.12); *G01N 21/66* (2013.01)

(58) Field of Classification Search
CPC .......... H02S 50/15; G01N 21/66; Y02E 10/50
See application file for complete search history.

(56) References Cited

U.S. PATENT DOCUMENTS

2015/0303868 A1* 10/2015 Sinton .................... H02S 50/10 324/761.01
2017/0237396 A1 8/2017 Zimmermann et al.

(Continued)

FOREIGN PATENT DOCUMENTS

EP 2245473 B1 8/2012
WO 2013067573 A1 5/2013

OTHER PUBLICATIONS

Fell, Andreas & Wirtz, Wiebke & Höffler, Hannes & Greulich, Johannes. Determining the Generation Rate of Silicon Solar Cells from Reflection and Transmission Measurements by Fitting an Analytical Optical Model. 3037-3041. 10.1109/PVSC40753.2019.8980730, Feb. 2019.

(Continued)

*Primary Examiner* — Raul J Rios Russo
*Assistant Examiner* — Haidong Zhang
(74) *Attorney, Agent, or Firm* — Volpe Koenig

(57) ABSTRACT

A method for contactlessly assessing the quality of a solar cell includes performing a first luminescence measurement by applying excitation radiation to a first sub-region of the solar cell per first parameters and to a second sub-region (per second, different parameters. A first intensity of emitted luminescent radiation is measured in the first or second sub-region, and a second measurement measures a second intensity of luminescent radiation. In alternative A, excitation radiation is applied to the first sub-region per the first parameters and excitation radiation is applied to the second sub-region per third, different parameters. The second intensity is measured in the sub-region in which the first intensity is not measured in the first luminescence measurement.

(Continued)

Alternative B provides applying excitation radiation homogenously to the solar cell in both sub-regions according to fourth parameters and the second intensity is measured in the first and/or second sub-region. Quality information is then determined.

16 Claims, 8 Drawing Sheets

(56) References Cited

U.S. PATENT DOCUMENTS

2018/0309404 A1 * 10/2018 Hare ........................ F21S 8/006
2019/0312548 A1 * 10/2019 Fernandez .............. H02S 50/00

OTHER PUBLICATIONS

P. A. Basore, "Extended spectral analysis of internal quantum efficiency," Conference Record of the Twenty Third IEEE Photovoltaic Specialists Conference—1993 (Cat. No.93CH3283-9), Louisville, KY, USA, pp. 147-152, doi: 10.1109/PVSC.1993.347063, Jan. 1993.

K. O. Davis et al.: Electroluminescence Excitation Spectroscopy: A Novel Approach to Non-Contact Quantum Efficiency Measurements; 2017 IEEE 44th Photovoltaic Specialist Conference (PVSC), Washington, DC, pp. 3448-3451, doi: 10.1109/PVSC.2017.8366170, Jun. 2017.

Wasmer, Sven, Andreas A. Brand, and Johannes M. Greulich. "Metamodeling of numerical device simulations to rapidly create efficiency optimization roadmaps of monocrystalline silicon PERC cells." Energy Procedia 124: 207-214, 2017.

Kasemann, Martin [u.a.]: Contactless Qualitative Series Resistance Imaging on Solar Cells. In: IEEE Journal of Photovoltaics, vol. 2, Issue: 2, 181-183, Apr. 2012.

Trupke, Thorsten [u.a.]: Spatially resolved series resistance of silicon solar cells obtained from luminescence imaging. In: Applied Physics Letters, 90, 093506, 1-3. https://www.researchgate.net/publication/241615950, Feb. 2007.

Trupke, T. [u.a.]: Suns-photoluminescence: Contactless determination of current-voltage characteristics of silicon wafers. In: Applied Physics Letters (APL), Bd. 87, H. 9, Artikelnummer: 093503.—ISSN 1077-3118 (E); 0003-6951 (P). DOI: 10.1063/1.2034109. URL: https://aip.scitation.org/doi/pdf/10.1063/1.2034109 [abgerufen am Mar. 4, 2021], 2005.

* cited by examiner

METHOD AND DEVICE FOR ASSESSING THE QUALITY OF A SOLAR CELL

CROSS-REFERENCE TO RELATED APPLICATIONS

This application is a 371 National Phase of PCT/EP2021/085893, filed Dec. 15, 2021, which claims priority from German Patent application No. 10 2020 133 701.9, filed Dec. 16, 2020, both of which are incorporated herein by reference as if fully set forth.

TECHNICAL FIELD

The invention relates to a method and a device for contactlessly assessing the quality of a solar cell.

BACKGROUND

During the production of solar cells it is necessary, in the context of a quality assessment, to check whether the realized constitution of a solar cell produced corresponds to the required constitution thereof. In particular, this concerns the electrical properties of the tested solar cell, which have to range within predefined quality limits in order to be able to ensure a required efficiency of the solar cell during operation for converting sunlight into electrical energy.

For the quality assessment, methods and devices are known in which the solar cell is electrically contacted and impinged on by excitation radiation in order to be able to determine the electrical properties of the solar cell, in particular performance data. Measurement electronics are typically used, to which the electrodes of the solar cell are connected and which simulate an electrical load e.g. by predefining a voltage at the electrodes. If the voltage present at the electrodes is varied by means of the measurement electronics, different operating points of the solar cell can be represented. By measuring the current as a function of the voltage present, it is possible to derive a current-voltage characteristic curve of the solar cell, from the profile of which it is possible to determine quality information, in particular characteristic variables such as short-circuit current density, open-circuit voltage, fill factor and efficiency for the quality assessment of the solar cell.

In order to be able to ensure high quality rates, it is advantageous to carry out so-called 100% inline measurements (and/or: 100% inline tests), in which all the solar cells produced are assessed with regard to their quality while they are actually being produced. This has to be done within the cycle times of the respective production processes, which are becoming increasingly shorter in modern production methods. The electrical contacting process in known methods is time-intensive and can therefore be used only to a limited extent in methods with short cycle times. Therefore, there is a need for test and measurement methods, with shorter test and measurement times, such that quality assurance can be performed within the cycle times of modern production methods.

EP 2 245 473 B1 discloses a contactless method which enables a spatially resolved characterization of the solar cell. In that case, the solar cell is impinged on by excitation radiation inhomogeneously, wherein an excitation sub-region of the solar cell is illuminated, while a sink sub-region of the solar cell is shaded. The illumination of the solar cell leads to currents at the surface of the solar cell which flow from the excitation sub-region into the sink sub-region. The intensity of the luminescent radiation emitted by the solar cell is captured in a spatially resolved manner by an optical measuring device. The spatial positions of locally increased series resistances can be determined on the basis of the intensity distribution.

SUMMARY

The invention is based on the object of providing a method and a device which make it possible to determine global quality information of a solar cell in a shorter time than the known methods and devices.

The object is achieved by means of a method for contactlessly assessing the quality of a solar cell having one or more of the features disclosed herein, and also a device having one or more of the features disclosed herein.

In the method according to the invention for contactlessly assessing the quality of a solar cell, a first luminescence measurement is carried out, wherein a first sub-region of the solar cell is impinged on by excitation radiation in accordance with a first set of parameters and a second sub-region of the solar cell is impinged on by excitation radiation in accordance with a second set of parameters, which is different than the first set of parameters, and a first intensity $\Phi_1$ of luminescent radiation emitted by the solar cell is measured in the first sub-region or the second sub-region.

In addition, a second luminescence measurement is carried out, wherein a second intensity $\Phi_2$ of luminescent radiation emitted by the solar cell is measured, wherein in accordance with an alternative A, the first sub-region of the solar cell is impinged on by excitation radiation in accordance with the first set of parameters and the second sub-region of the solar cell is impinged on by excitation radiation in accordance with a third set of parameters, which is different than the first set of parameters, and the second intensity $\Phi_2$ is measured in that sub-region in which the first intensity $\Phi_1$ is not measured in the first luminescence measurement.

In accordance with an alternative B, in the second luminescence measurement the solar cell is impinged on homogeneously by excitation radiation in the first and second sub-regions in accordance with a fourth set of parameters and the second intensity $\Phi_2$ is measured in the first sub-region and/or the second sub-region.

In an evaluation step, quality information is determined depending on the first intensity $\Phi_1$ and the second intensity $\Phi_2$.

The essential advantage in carrying out the method according to the invention is that a global quality assessment of the solar cell can be performed entirely without electrical contacting with a short measurement and evaluation duration.

In the first luminescence measurement, the first sub-region and the second sub-region of the solar cell are impinged on by different excitation radiation in accordance with a first set of parameters and a second set of parameters, which is different than the first. The difference between the sets of parameters preferably resides in at least one or a plurality of the following parameters: intensity of the excitation radiation, wavelength or spectrum of the excitation radiation. An essential insight on the part of the applicant is that the parameter in terms of which the sets of parameters differ is unimportant, in principle, provided that said difference brings about a charge carrier flow between the first and second sub-regions. A charge carrier flow between the sub-regions is attained by virtue of the fact that charge carriers are generated by means of the excitation radiation differently in one sub-region compared with the second sub-region.

The difference in the excitation radiations of the sub-regions has the effect that a charge carrier flow takes place between the sub-regions. This state can be described in a simplified equivalent circuit diagram of the inhomogeneously illuminated solar cell; see FIG. 1: A current source 2 represents a region of a solar cell 1 in which charge carrier separation takes place as a result of absorption of incident excitation radiation. The ohmic resistance 3 represents the series resistance of the solar cell 1. A first diode 4 represents the solar cell 1 in the first sub-region, while a second diode 5 represents the solar cell 1 in the second sub-region.

In the example in accordance with FIG. 1, it is assumed that charge carrier separation takes place exclusively or at least to a significantly higher extent in the second sub-region of the solar cell than in the first sub-region. The current flow of the current source 2 therefore branches at a node 6 firstly to the first diode 4, which is assigned to the first sub-region and which is arranged in a common series circuit together with the ohmic resistance 3, and secondly to the second diode 5 assigned to the second sub-region. Furthermore, under the assumption of the equivalent circuit diagram described above, a closed circuit is formed by the first diode 4 and the second diode 5 and also the ohmic resistance 3 of the solar cell 1.

One essential insight on the part of the applicant stems from the fact that in principle any solar cell can be characterized by establishing a voltage balance at the closed circuit formed by the ohmic resistance 3, the first diode 4 and the second diode 5 and/or by establishing a current balance at the node 6.

A further insight on the part of the applicant is that the generated charge carrier flow that is divided between the two sub-regions of the solar cell owing to the inhomogeneous illumination of the solar cell brings about luminescent radiation in both sub-regions, which are influenced by the electrical properties of the solar cell and are reflected in the electrical characteristic variables of the equivalent circuit diagram of the inhomogeneously illuminated solar cell. Measuring the first and second intensities makes it possible to draw a conclusion about individual terms of the voltage balance and/or current balance and thereby to characterize the solar cell. The relationships prevailing here are described below.

If, taking into account the equivalent circuit diagram in accordance with FIG. 1, a voltage balance is established in the closed circuit formed by the series resistance 3, the first diode 4 and the second diode 5, it transpires on the basis of Kirchhoff's voltage law that the voltage drop across the series resistance 3 results from the sum of the voltages present at the first diode 4 and at the second diode 5.

The voltages present at the first diode 4 and at the second diode 5 can be determined in each case by measuring an intensity of the luminescent radiation emitted by the solar cell in the first sub-region or in the second sub-region. The relationship between the first intensity and one of the voltages can be described by equation (1).

$$\phi_1 = C^* \exp(V_1/V_1) \qquad \text{equation (1)}$$

In accordance with equation (1), $V_1$ is one of the voltages, which is present either at the first diode or at the second diode. Which of the two voltages this is depends on the sub-region in which the first intensity is measured: if the first intensity is measured in the first sub-region, then $V_1$ corresponds to the voltage present at the first diode 4 in accordance with FIG. 1. If the first intensity is measured in the second sub-region, then $V_1$ corresponds to the voltage present at the second diode 5 in accordance with FIG. 1. $V_t$ is a thermal voltage of the solar cell, and C is a calibration constant, which is dependent in particular on the measurement conditions in the luminescence measurement.

What is essential is that the thermal voltage $V_t$ and the calibration constant do not have to be known, rather all that needs to be known is that the measured first intensity $\phi_1$ can be expressed as a function of the first voltage $V_1$, and vice versa.

If equation (1) is solved with respect to the voltage $V_1$, then the voltage $V_1$ can be inserted into the established voltage balance. This has the consequence that the voltage balance has a voltage term expressed as a function of the first intensity. Since the closed circuit in which the voltages are balanced has three voltages, the voltage balance also has three terms. In order that a voltage can be determined directly on the basis of the voltage balance, at least one further voltage term has to be ascertained more specifically. The applicant's insight according to the invention is that said voltage term can be ascertained by carrying out a further luminescence measurement. This procedure is reflected in the second luminescence measurement in accordance with alternative A.

In the second luminescence measurement in accordance with alternative A, the second intensity is measured in that sub-region in which the first intensity was not measured in the first luminescence measurement. This yields the second intensity. The latter is likewise dependent on the thermal voltage $V_t$ of the solar cell, and the calibration constant C, according to equation (2).

$$\phi_2 = C^* \exp(V_2/V_t) \qquad \text{equation (2)}$$

The voltage $V_2$ is that voltage which is present at that diode which represents the sub-region of the solar cell in which the second intensity was measured. This means that the implicit voltage $V_2$ corresponds to the voltage in the second sub-region of the solar cell if the voltage $V_1$ was measured in the first sub-region, and vice versa.

When carrying out the second luminescence measurement, it is not important whether the calibration constant C or the thermal voltage $V_t$ is known. What is essential, rather, is that the voltage $V_2$ can be expressed as a function of the second intensity by rearranging equation (2).

If equation (2) is rearranged with respect to the voltage $V_2$, then the resulting voltage can be inserted into the established voltage balance.

On the basis of the first voltage $V_1$ and the second voltage $V_2$, it is thus possible overall to express two of the three voltage terms of the voltage balance as a function of the first and second intensities. Since the first voltage $V_1$ and the second voltage $V_2$ respectively correspond to the voltages present at the diodes, the voltage balance can be rearranged in this way with respect to the voltage present at the ohmic resistance 3 (cf. FIG. 1). Since the ohmic resistance 3 represents the series resistance of the solar cell, a conclusion about the quality of the solar cell can thus be drawn directly on the basis of the first and second intensities.

An insight on the part of the applicant that is essential to the invention is that the values of the calibration constant C or of the thermal voltage $V_t$ when carrying out the first luminescence measurement and the second luminescence measurement in accordance with alternative A are not relevant to the implementability of the method. It is only advantageous if the calibration constant C and the thermal voltage $V_t$ do not vary significantly, and are preferably constant, between the first luminescence measurement and the second luminescence measurement in accordance with alternative A.

In the simplest form of application of the method, it is thus possible to test a plurality of solar cells by carrying out the first luminescence measurement and the second luminescence measurement in accordance with alternative A by way of measuring the first and second intensities at a plurality of solar cells produced. Since the calibration constant C and the thermal voltage $V_t$ do not fluctuate significantly, they have a constant influence on the measured intensities. Consequently, on the basis of a difference or fluctuation between the first and/or second measured intensities of at least two tested solar cells, a possible difference in quality can be deduced directly.

It also lies within the scope of the invention that the first and second intensities can influence the calculation of a freely definable characteristic value with which the quality information is representable. In the simplest case, said characteristic value can be a quotient between the first and second intensities and can be used e.g. to assign a manufactured solar cell to a quality class.

With regard to the sets of parameters in accordance with which the solar cell is impinged on by excitation radiation in the first luminescence measurement and the second luminescence measurement in accordance with alternative A, it is essential that the first set of parameters is different than the second and third sets of parameters in terms of at least one parameter. This ensures that the solar cell is impinged on inhomogeneously by excitation radiation both in the first luminescence measurement and in the second luminescence measurement in accordance with alternative A. It is only by this means that the model-related assumptions in association with the equivalent circuit diagram of a solar cell impinged on inhomogeneously by excitation radiation can find application.

Furthermore, with regard to the sets of parameters of the first luminescence measurement and of the second luminescence measurement in accordance with alternative A, it is unimportant in principle whether the second set of parameters is different than the third set of parameters in terms of one or a plurality of parameters. In particular, they need not be identical.

If the second set of parameters is different than the third set of parameters in terms of one or a plurality of parameters, then the voltages in the first and second sub-regions (represented by diodes 4, 5 in accordance with FIG. 1) vary between the first luminescence measurement and the second luminescence measurement in accordance with alternative A. On the one hand, this means that the same voltage balance cannot hold true for the first and second luminescence measurements. On the other hand, an essential insight on the part of the applicant is that an influence of a parameter difference between the second and third sets of parameters can influence the voltage balance in the form of a correction term. Said correction term can be designed e.g. in the form of a coefficient by which the first or second measured intensity is multiplied. If the second set of parameters is thus different than the third set of parameters in terms of an excitation intensity, for example, the present intensity difference can be taken into account by way of using the correction term according to the estimated intensity difference in order to computationally adapt the first or second intensity and thus also a voltage term of the voltage balance.

By contrast, if the parameter in terms of which and the absolute value by which the second set of parameters is different than the third set of parameters are not known, then ensuring that the second and third sets of parameters do not vary significantly between a plurality of tested solar cells, and preferably comprise constant parameters, is sufficient for carrying out the method. As a result, a plurality of solar cells can be tested relative to one another with regard to their qualities by virtue of the fact that a difference or fluctuation of the first and/or second intensity between at least two tested solar cells is determined and a quality deviation in one of the solar cells can thus be deduced directly.

A further insight on the part of the applicant that is essential to the invention is reflected in the implementation of the second luminescence measurement in accordance with alternative B. This insight is based on the fact that instead of a voltage balance, it is also possible to establish a current balance at the node 6 of the equivalent circuit diagram of an inhomogeneously illuminated solar cell, on the basis of which the solar cell can be characterized.

It is known that the division ratio of a current at a node of an electrical circuit is dependent on what ohmic resistances are present in the lines between which the current is divided downstream of said node. With regard to the equivalent circuit diagram of the solar cell impinged on inhomogeneously by excitation radiation in accordance with FIG. 1, the ohmic resistance 3, in particular, influences the division ratio of the generation current $I_{sc,h}$ at the node 6. In a typical manner of notation, the index "gen" denotes solar cell characteristic variables with regard to the generation current, while the index "$_{sc}$" typically serves to identify solar cell characteristic variables in a short-circuit state. In the present case, however, the difference between the generation current and the short-circuit current is disregarded in the assumed simplification. Recombination effects in both equivalent circuit diagrams described are taken into account by the arrangement of the diodes described. The generation current and the short-circuit current are therefore assumed to be identical variables. In particular, the same conformities to laws that can also be used for the characterization of the short-circuit current can be consulted for the characterization of the generation current. Hereinafter, therefore, the generation current and variables derived therefrom are described using the index "se".

A current balance according to Kirchhoff's current law at the node 6 reveals that the current intensity of the generation current $I_{sc,h}$ of the current source 2 corresponds to the sum of the current intensities of those currents which flow firstly through the series circuit formed by first diode 4 and ohmic resistance 3 and secondly through the second diode 5.

The current intensities of the current balance can be expressed as a function of their respective current densities. In particular, the current intensities of the currents which flow through the first diode 4 and/or the second diode 5 can be expressed as a function of a current density which, for its part, is dependent on a saturation current density $j_0$ of the respective diode, the voltage present at the diode, and also the thermal voltage $V_t$. Carrying out the first luminescence measurement results in a relationship according to equation (3) for said current density in the first or second diode.

$$j_1=j_0*\exp(V_1/V_1) \quad \text{equation (3)}$$

In this case, $j_1$ is the current density in the first or second diode and $j_0$ is the saturation current density of the diode. The implicit voltage $V_1$ and the thermal voltage $V_t$ respectively correspond to the voltage $V_1$ and the thermal voltage $V_t$ in accordance with equation (1). This therefore stems from the fact that the same conditions prevail in the first luminescence measurement independently of whether a voltage balance or a current balance is established.

If equation (1) is solved with respect to the ratio of the voltage $V_1$ to the thermal voltage $V_t$, the resulting term can be inserted into equation (3). The current density of a current in the first or second diode is thus dependent on the first intensity $\phi_1$.

In order that the division ratio of the generation current can be determined on the basis of the current balance, at least one further current intensity of the current balance has to be ascertained more specifically. The second luminescence measurement in accordance with alternative B can be carried out for this purpose. In contrast to the second luminescence measurement in accordance with alternative A, it is not necessary to implement the second intensity on an inhomogeneously illuminated solar cell. Instead, the solar cell can be illuminated homogeneously, wherein the second intensity can be measured in an arbitrary sub-region of the solar cell.

If a solar cell is illuminated homogeneously, however, the current flow in the solar cell changes by comparison with an inhomogeneously illuminated solar cell, since the latter is in an open-circuit condition. This means that although a voltage, the so-called open-circuit voltage (also called: no-load voltage), is present at its electrodes, no external current flows. The charge carrier pairs generated in the solar cell as a result of absorption of the excitation radiation recombine approximately substantially at the same location, and so disregarding considerable local defects, no currents or only currents of low current intensity flow in the solar cell under an open-circuit condition.

If this is applied to an electrical equivalent circuit diagram, the following differences arise compared with the equivalent circuit diagram of the inhomogeneously illuminated solar cell. The illuminated region of the solar cell is represented by a current source 2 (see FIG. 6). The current flow of the current source 2 represents the generation current generated as a result of absorption of the excitation radiation and charge carrier separation in the solar cell. A third diode 18 is connected in parallel with the current source 2. On the basis of the assumption that no current flows between the electrodes of the solar cell, to a good approximation the entire generation current flows through the third diode 18 on account of the third diode 18 and the current source 2 being connected in parallel.

Consequently, if the second intensity is measured in an arbitrary sub-region of the homogenously illuminated solar cell, the electrical properties of which sub-region are represented by the third diode, the second intensity is dependent on the saturation current density in the third diode analogously to the relationship in accordance with equation (3). To a good approximation the generation current density corresponds to the current density in the third diode, and so the generation current density can be expressed as a function of the saturation current density in the third diode and thus also the second intensity.

With regard to the current balance, by means of the first luminescence measurement, a current intensity of the current which flows in the first or second diode can be expressed as a function of the first intensity. By means of the second luminescence measurement in accordance with alternative B, the current intensity of the generation current can be expressed as a function of the second intensity. Since the current balance comprises a total of three current intensity terms, the sum of which must equal zero, one of the current intensities can thus be expressed as a function of the other two current intensities and thus also as a function of the first and second intensities. This relationship allows a conclusion to be drawn regarding the ratio in which the generation current is divided between the first and second sub-regions of an inhomogeneously illuminated solar cell. This in turn allows a conclusion to be drawn about the influence of the series resistance of the solar cell, which constitutes quality information.

An insight on the part of the applicant that is essential to the invention is that the value of the saturation current density $j_0$ when carrying out the first luminescence measurement and the second luminescence measurement is unimportant. Since the saturation current density constitutes a solar cell property that does not fluctuate between the first luminescence measurement and the second luminescence measurement, it can be assumed that the saturation current density $j_0$ has a constant influence on the determinable intensities. In the simplest form of application of the method, it is thus possible to determine the first and second intensities for at least two solar cells to be tested, and to attribute a difference or fluctuation of the first and/or second intensity between two tested solar cells directly to a quality deficiency in one of the tested solar cells.

With regard to the sets of parameters in accordance with which the solar cell is impinged on by excitation radiation in the first luminescence measurement and the second luminescence measurement in accordance with alternative B, it is essential that the first set of parameters is different than the second set of parameters in terms of at least one parameter. However, it is unimportant in principle whether the first or the second set of parameters is different than the fourth set of parameters in each case in terms of one or a plurality of parameters. If this is the case, then the currents which flow in the first and second sub-regions (represented by diodes 4, 5 in accordance with FIG. 1) can fluctuate between the first luminescence measurement and the second luminescence measurement in accordance with alternative B. However, analogously to the explanations concerning the second luminescence measurement in accordance with alternative A, such a fluctuation can be taken into account by means of a correction term in the current balance. In this case, the correction term can be designed in the form of a coefficient by which the first or the second measured intensity is multiplied. If the second set of parameters is different than the fourth set of parameters in terms of an excitation intensity, for example, the present intensity difference can be used for determining the error term with which the first or the second intensity is adapted in terms of absolute value after its measurement.

By contrast, if the parameter in terms of which and the absolute value by which the first or second set of parameters is different than the fourth set of parameters are not known, ensuring that the first, second and fourth sets of parameters in each case do not vary significantly between a plurality of tested solar cells is sufficient for the applicability of the method. As a result, it can be assumed that a difference between the sets of parameters has a constant influence on the measured intensities. As a result, a difference or fluctuation of the first and/or second intensity between two tested solar cells can be attributed directly to a quality deficiency in one of the solar cells.

In one advantageous development of the method, the first luminescence measurement comprises a first individual measurement, by means of which the first intensity is measured spatially independently for the entire first or second sub-region. Furthermore, the second luminescence measurement comprises a second individual measurement, by means of which the second intensity is likewise measured spatially independently in that sub-region in which the first intensity is not measured in accordance with alternative A or is measured spatially independently in the first and/or second sub-region in accordance with alternative B. The first intensity and the second intensity are each present as an individual value. The quality information is spatially independent quality information regarding the entire solar cell.

The development described above is based on the insight that the quality of the entire solar cell is determinable as global quality information by means of only two intensity measurements. Both for the first individual measurement and for the second individual measurement, an individual sensor element can thus be used which measures the intensity of the luminescent radiation in each case spatially independently in one or both sub-regions. The quality information regarding the entire solar cell can preferably be determined just on the basis of the two measured intensities. It is preferred to carry out more than just two luminescence measurements that each contain an individual measurement.

Contrary to the method known from EP 2 245 473 B1, a spatially resolved characterization of the solar cell is not effected. In the case of the previously known method, in a luminescence measurement it is necessary to measure a plurality of intensity values and assign each of them to a position on the solar cell. In contrast thereto, in accordance with the advantageous development, it is provided that an intensity value is in each case measured at least in the first luminescence measurement and in the second luminescence measurement and said intensity value is in particular not assigned to a position on the solar cell.

In one advantageous development of the method, the first set of parameters is different than the second, third and fourth sets of parameters in terms of an illumination intensity, wherein the first set of parameters preferably comprises a first illumination intensity at a level of 0 watts per square meter, such that the first sub-region is not illuminated, in particular is shaded, in the first luminescence measurement and in the second luminescence measurement in accordance with alternative A. Preferably, the second set of parameters, the third set of parameters and the fourth set of parameters each comprise at least one second illumination intensity which is preferably at least 30 watts per square meter, with preference at least 50 $W/m^2$, with further preference at least 1000 $W/m^2$.

The applicant's insight underlying this advantageous development of the method is that a difference in the illumination intensity has a higher than average influence on the formation of a charge carrier flow between the first and second sub-regions. The latter is necessary, as already described, in order, on the basis of the first and second measured intensities, to be able to assess the electrical properties of the electrical network according to the equivalent circuit diagrams of a solar cell impinged on inhomogeneously by excitation radiation and a solar cell impinged on homogeneously by excitation radiation.

It is possible to achieve the advantage as a result of the described intensity difference in a particularly simple manner if the first sub-region is not illuminated, and is preferably shaded. The essential advantage in the shading of the first sub-region can be seen in the fact that simple means, e.g. in the form of a shadow mask or some other light-nontransmissive device, can be used to realize inhomogeneous impingement on the solar cell at least in the first luminescence measurement. This reduces the open-loop and closed-loop control complexity compared with a measurement configuration in which the illumination intensity of the first set of parameters has to correspond to a nominal value not equal to 0 watts per square meter.

Furthermore, the shading of the first sub-region when determining the first or second intensity in the first sub-region is accompanied by fewer disturbing extraneous light influences. As a result, a measuring device for determining the first or second intensity in the first sub-region can be designed in a simple manner, e.g. as a matrix camera, in which compensation of said disturbing light influences does not have to be realized.

With regard to the second illumination intensity, if it is designed to be identical for the second, third and fourth sets of parameters, the quality assessment of the solar cell can be simplified further. This stems from the fact that the illumination intensity has a significant influence on the generation current: if the illumination intensities in the first and second luminescence measurements are harmonized by way of the common second illumination intensity, then the generation current, in particular the generation current density, is harmonized as well. As a result, one and the same voltage balance and current balance can be assumed for the first luminescence measurement and the second luminescence measurement (in accordance with alternatives A and B). Although the influence of a fluctuating illumination intensity, as described with regard to the method according to the invention, can be computationally compensated for by means of a correction term, the susceptibility of the method to errors decreases if there is no need to provide an additional correction term.

In one advantageous development of the method, the evaluation step involves determining a current density and a voltage at an operating point of the solar cell, wherein the current density and the voltage are dependent on the first intensity and the second intensity.

The advantage in determining a current density is that the latter constitutes a familiar physical variable with which the solar cell can be described analytically. Determining the current density enables the solar cells tested according to the invention to be compared with other solar cells in which the current density was ascertained e.g. in a conventional manner.

With regard to the equivalent circuit diagram of a solar cell impinged on inhomogeneously by excitation radiation, in particular that current density which is present in that sub-region which is represented by diode 4 according to FIG. 1 is of relevance to the quality assessment. Said diode is arranged in a series circuit with the ohmic resistance in an inhomogeneously illuminated solar cell. The current density in the first sub-region of the solar cell is involved in the case of a shaded first sub-region.

In order to determine the current density, the circumstance that is taken into account once again is that the first intensity and the second intensity can each be expressed as a function of a voltage of the solar cell which is present in the first sub-region and respectively the second sub-region of the solar cell. This is described by equations (1) and (2). For the first luminescence measurement, the relationship according to equations (1) and (2) can also be expressed by equation (4).

$$\phi_1 = C^* \exp(\{V_{TB1} \vee V_{TB2}\}/V_t) \qquad \text{equation (4)}$$

In this case, $\phi_1$ is the first intensity, dependent on the voltage $V_{TB1}$ or $V_{TB2}$. The dependence arises, as described with regard to the method according to the invention, depending on the sub-region in which the first intensity $\phi_1$ was measured. The dependence on the voltage $V_{TB1}$ arises if the first intensity $\phi_1$ was measured in the first sub-region. If the first intensity $\phi_1$ was measured in the second sub-region, it is dependent on the voltage $V_{TB2}$.

In the event of carrying out the second luminescence measurement according to alternative A, then the second intensity $\phi_2$ likewise arises depending on the sub-region in which the first intensity $\phi_1$ was measured. If the first intensity was measured in the first sub-region, then the relationship according to equation (5) holds true for the second intensity.

$$\phi_2=C^*\exp(V_{TB2}/V_t) \quad \text{equation (5)}$$

By contrast, if the first intensity $\phi_1$ was measured in the second sub-region, then the relationship according to equation (6) holds true for the second intensity.

$$\phi_2=C^*\exp(V_{TB1}/V_t) \quad \text{equation (6)}$$

According to the equivalent circuit diagram of the solar cell impinged on inhomogeneously by excitation radiation in accordance with FIG. 1, a current balance according to equation (7) arises for the current balance at the node 6 between the current source 2 and the first diode 4 (corresponds to first sub-region) and the second diode 5 (corresponds to second sub-region).

$$I_{gen}=I_{TB1}+I_{TB2} \quad \text{equation (7)}$$

In this case, $I_{gen}$ is the current intensity of the generation current output by the current source, $I_{TB1}$ is the current intensity of the current which flows through the first diode 4, and $I_{TB2}$ is the current intensity of the current which flows through the second diode 5.

Analyses by the applicant have shown that the determination of the current density is simplified if the first and second sub-regions are based on areas of equal size in which they are impinged on by excitation radiation. In the case of identical area sizes that can be assigned to the first and second sub-regions of the solar cell, equation (7) can be expressed as a function of the current densities of the respective currents. The relationship in accordance with equation (8) holds true here.

$$j_{gen}=j_{TB1}{}^*0.5+j_{TB2}{}^*0.5 \quad \text{equation (8)}$$

In this case, $j_{gen}$ is the generation current density and $j_{TB1}$ and $j_{TB2}$ are the current densities of the currents in the first and respectively the second sub-region of the solar cell. The relationship in accordance with equation (8) analogously holds true for the short-circuit current density $j_{sc}$. If it is taken into account that, analogously to the relationship in accordance with equation (3), the current densities $j_{TB1}$ and $j_{TB2}$ can each be expressed as a function of a common saturation current density $j_0$ and the implicit voltage $V_{TB1}$ and $V_{TB2}$ respectively present in each case, the relationship in accordance with equation (8) can be represented according to equation (9).

$$j_{gen}=j_0{}^*\exp(V_{TB1}/V_t)^*0.5+j_0{}^*\exp(V_{TB2}/V_t)^*0.5 \quad \text{equation (9)}$$

By rearranging equations (4)-(6) according to the respective underlying voltage ratios, it is possible for the relationship according to equation (9) to be expressed according to equation (10).

$$j_{gen}=j_0{}^*\phi_1/C^*0.5+j_0{}^*\phi_2/C^*0.5 \quad \text{equation (10)}$$

Solving equation (10) with respect to the saturation current density $j_0$ yields equation (11).

$$j_0=j_{gen}/(\phi_1/C^*0.5+\phi_2/C^*0.5) \quad \text{equation (11)}$$

The saturation current density can thus be expressed as a function of the generation current density $j_{gen}$ and also the first and second intensities.

One insight on the part of the applicant is that in the case of an inhomogeneously illuminated solar cell, the current density in the region exhibiting series resistance can be expressed in accordance with equation (12) if the first intensity is measured in the first sub-region, which can be represented by the first diode 4 in accordance with FIG. 1.

$$j_{TB1}(V=V_{TB1})=-j_0{}^*\exp(V_{TB1}/V_t) \quad \text{equation (12)}$$

In joint consideration with equation (11), equation (12) can be rearranged according to equation (13).

$$j_{TB1}(V=V_{TB1})=-j_{gen}/(0.5^*(1+\phi_2/\phi_1)) \quad \text{equation (13)}$$

The voltage point V here corresponds to the voltage $V_{TB1}$, which can be expressed as a function of the first intensity $\phi_1$ by equation (14) presented below if the first intensity in the first luminescence measurement is measured in the first sub-region.

$$V=V_{TB1}=V_t{}^*\ln(\phi_1/C) \quad \text{equation (14)}$$

The thermal voltage $V_t$, the calibration constant C and the generation current density $j_{gen}$ need not necessarily be known in order to be able to determine a current density at a voltage point on the basis of the first and second intensities. Rather, the applicant's insight is that meaningful quality information in the form of a current density can be derived solely on the basis of the known first and second intensities. This can be done, for example, by assuming for a plurality of tested solar cells that the thermal voltage $V_t$, the calibration constant C and the generation current density $j_{gen}$ are substantially constant and have a correspondingly constant influence on the determinable current density and also the voltage point. The current densities of at least two tested solar cells can thus be compared relatively to one another.

Alternatively, for the thermal voltage $V_t$, the calibration constant C and the generation current density $j_{gen}$, estimated values can be assumed or determined on the basis of reference measurements.

Equations (1)-(14) are based overall on a greatly simplified assumption with regard to the electrical properties of a solar cell to be tested which is impinged on inhomogeneously by excitation radiation and has an equivalent circuit diagram in accordance with FIG. 1. This has the advantage that the solution to equations (1)-(14) can be implemented in a simple manner for automated quality monitoring of the solar cell in a test device in order to automate the method according to the invention for contactlessly assessing the quality of solar cells.

However, a further insight on the part of the applicant is that the relationships underlying the invention are not limited to the model-related equivalent circuit diagram of a solar cell impinged on inhomogeneously by excitation radiation in accordance with FIG. 1. Rather, in order to increase the accuracy in the calculation of quality-dependent characteristic values, it is advantageous if the equivalent circuit diagram of the solar cell impinged on inhomogeneously by excitation radiation has a higher degree of detail with regard to its component parts and is preferably designed according to FIG. 2.

The equivalent circuit diagram in accordance with FIG. 2 differs from FIG. 1 insofar as two ohmic resistances 3' and 3" connected in series are arranged instead of one ohmic resistance 3. This takes account of the applicant's insight that not just the first sub-region of the solar cell exhibits series resistance, so does the second sub-region of the solar cell as well. Overall, the equivalent circuit diagram in accordance with FIG. 2 represents the actual electrical properties of a solar cell with higher accuracy than the equivalent circuit diagram in accordance with FIG. 1.

The division of the ohmic resistance 3 in accordance with FIG. 1 into the ohmic resistances 3' and 3" has no effects for the relationships expressed by equations (1)-(11). Consequently, equations (1)-(11) also hold true for the characterization of a solar cell impinged on inhomogeneously by excitation radiation in accordance with FIG. 2. With regard to equation (12), however, the relationship in accordance with equation (12') arises.

$$j_{TB1}(V=V_m)=-j_0*\exp(V_{TB1}/V_t) \quad \text{equation (12')}$$

In contrast to equation (12), the current density $j_{TB1}$ is determined as a function of the voltage $V_m$, presented between the resistances 3' and 3" according to FIG. 2.

In joint consideration with equation (11), equation (12') can be rearranged to form equation (13').

$$j_{TB1}(V=V_m)=-j_{gen}/(0.5*(1+\phi_2/\phi_1)) \quad \text{equation (13')}$$

The voltage point V here corresponds to the voltage $V_m$, which can be expressed as a function of the first and second intensities $\phi_1$, $\phi_2$ by equation (14') presented below if the first intensity in the first luminescence measurement is measured in the first sub-region and the second intensity in the second luminescence measurement is measured in the second sub-region.

$$V=V_m=0.5*V_t*\{\ln(\phi_1/C)+\ln(\phi_2/C)\} \quad \text{equation (14')}$$

It lies within the scope of the invention that a current density or a voltage point can be calculated on the basis of the model-related assumptions underlying the equivalent circuit diagram in accordance with FIG. 1. Additionally or alternatively, the method for calculating a current density or a voltage point can be effected on the basis of the model-related assumptions underlying the equivalent circuit diagram in accordance with FIG. 2.

In the event of carrying out the second luminescence measurement according to alternative B, given homogeneous illumination, the second intensity arises according to equation (15) instead of equations (5) and (6).

$$\phi_2=C*\exp(V_{OC}/V_t) \quad \text{equation (15)}$$

$V_{OC}$ describes the open-circuit voltage of the solar cell. Under the present conditions of an uncontacted and homogenously exposed solar cell, the generation current density $j_{gen}$ corresponds to the recombination current density of the solar cell. This results in the relationship between the generation current density $j_{gen}$ and the saturation current density $j_0$ according to equation (16).

$$j_{gen}=j_{rec}=j_0*\exp(V_{OC}/V_t) \quad \text{equation (16)}$$

By rearranging equation (15) with respect to the ratio of the open-circuit voltage to the thermal voltage $V_{OC}/V_t$, the resulting term can be inserted into equation (16). For the saturation current density $j_0$, this results in the relationship according to equation (17).

$$j_0=j_{gen}*C/\phi_2 \quad \text{equation (17)}$$

In principle, when carrying out the second luminescence measurement in accordance with alternative B, it is unimportant whether the first intensity is determined in the first sub-region or in the second sub-region during the first luminescence measurement. However, it is necessary to take account of the fact that only one of the two sub-regions is represented by a diode which, depending on the model-related assumption of the solar cell impinged on inhomogeneously by excitation radiation, is connected in series with one or two ohmic resistances (see explanations concerning FIG. 1 and concerning FIG. 2).

On the basis of the applicant's insights, a required case differentiation thus arises when determining the current density if the second luminescence measurement is carried out according to alternative B. For the explanations below it is assumed that the first sub-region is representable by a diode 4 which, according to the equivalent circuit diagram in accordance with FIG. 2, is arranged in a series circuit with the ohmic resistances 3' and 3", and the second sub-region is represented by diode 5.

If the first intensity was measured in the first sub-region in the first luminescence measurement, inserting the current density $j_0$ in accordance with equation (17) and the relationship in accordance with equation (4) into equation (12) yields the relationship in accordance with equation (18).

$$j_{TB1}(V=V_m)=-j_{gen}*\phi_1/\phi_2 \quad \text{equation (18)}$$

In this case, $j_{TB1}$ is the relevant current density of the current in the diode 4.

By contrast, if the first intensity was measured in the second sub-region of the solar cell, the relationship in accordance with equation (19) arises for the current density.

$$j_{TB1}(V=V_m))=-j_{gen}*(1-\phi_1/\phi_2) \quad \text{equation (19)}$$

As in equation (18), V corresponds to the voltage point, which has to be determined as a function both of the first intensity and of the second intensity in accordance with equation (20).

$$V=V_t*\ln(\phi_1/C)+0.5*Vt*\ln(\phi_2/\phi_1-1) \quad \text{equation (20)}$$

In one advantageous development of the method, the current density is determined depending on a first area ratio, which is dependent on a ratio between an area of the first sub-region impinged on by excitation radiation or an area of the second sub-region impinged on by excitation radiation and a quality-relevant total area of the solar cell.

The quality-relevant total area of the solar cell can correspond to the entire surface area of the solar cell (hereinafter: total area) or just a defined region of the total area, from which e.g. an edge region of the solar cell is excluded. The area of the first sub-region that is not impinged on by excitation radiation (hereinafter: first sub-area) and the area of the second sub-region that is impinged on by excitation radiation (hereinafter: second sub-area) can have different dimensions. Equation (21) holds true for the relationship between the total area and the two sub-areas.

$$A=A_1+A_2 \quad \text{equation (21)}$$

In this case, A is the total area, $A_1$ is the first sub-area and $A_2$ is the second sub-area. It lies within the scope of the invention that the total area can be subdivided into further sub-areas.

By way of example, a relationship in accordance with equation (22) can be assumed for the first area ratio f.

$$f=A_2/A \quad \text{equation (22)}$$

If, in the first luminescence measurement on the basis of the equivalent circuit diagram underlying that, a current balance is formed at the node between the current source and the diodes respectively representing the first and second sub-regions, the relationship according to equation (7) can be assumed. If the currents $I_{TB1}$ and $I_{TB2}$ in equation (7) are expressed as a function of their current density, the sub-areas $A_1$ and $A_2$ influence the current balance according to equation (23).

$$A*j_{gen}=j_{TB1}*A_1+j_{TB2}*A_2 \quad \text{equation (23)}$$

Taking equation (22) into account, this results in the relationship in accordance with equation (24).

$$j_{gen}=j_{TB1}*(1-f)/f+j_{TB2} \quad \text{equation (24)}$$

Taking into account the same relationships which are represented by equations (9)-(11), equations (13), (18) and (19) vary taking into account the first area ratio f in the manner described below.

If the first intensity is measured in the first sub-region of the solar cell, which first sub-region is represented by diode 4 in the equivalent circuit diagram in accordance with FIG. 1, and the second intensity is measured in the second sub-region, which is represented by diode 5, the current density arises according to the relationship in accordance with equation (25).

$$j(V=V_{TB1}=V_t*\ln[\phi_1/C])=-j_{gen}/f*(1-f)/(1-f+f*\phi_2/\phi_1) \quad \text{equation (25)}$$

If the first intensity is measured in the first sub-region of the solar cell, which first sub-region is represented by diode 4 in accordance with FIG. 1, and the second intensity is measured according to the second luminescence measurement in accordance with alternative B, the relationship in accordance with equation (26) arises for the current density.

$$j(V=V_t*\ln[\phi_1/C])=-j_{gen}*\phi_1/\phi_2*(1-f)/f \quad \text{equation (26)}$$

If the first intensity is measured in the second sub-region of the solar cell, which second sub-region is represented by diode 5 in accordance with FIG. 1, and the second intensity is measured according to the luminescence measurement in accordance with alternative B, the relationship in accordance with equation (27) arises for the current density.

$$j(V=V_{TB1}=V_t*\ln\{[\phi_2-\phi_1]/C*f/[1-f]\})=-j_{gen}*[1-\phi_1/\phi_2] \quad \text{equation (27)}$$

It is thus possible to take account of an arbitrary first area ratio f when determining the current density. The accuracy when determining the current density increases as a result, particularly if it cannot be ensured that the first and second sub-areas are identical or have sufficiently constant dimensions between a plurality of measurements.

If the model-related concept of a solar cell impinged on inhomogeneously by excitation radiation in accordance with FIG. 2 is taken as a basis for determining the current densities in accordance with equations (25)-(27), this results in the relationships according to equations (25'), (26') and (27') presented below.

In the event of the first intensity being measured in the first sub-region of the solar cell, which first sub-region is represented by diode 4 in the equivalent circuit diagram in accordance with FIG. 2, and with the second intensity being measured in the second sub-region represented by diode 5, the current density arises according to the relationship in accordance with equation (25').

$$j(V=V_m=f*V_t+*\ln[\phi_2/C]+(1-f)*V_t*\ln[\phi_1/C])=-j_{gen}*(1-f)/(1-f+f*\phi_2/\phi_1) \quad \text{equation (25')}$$

If the first intensity is measured in the first sub-region of the solar cell, which first sub-region is represented by diode 4 in accordance with FIG. 2, and the second intensity is measured according to the second luminescence measurement in accordance with alternative B, the relationship in accordance with equation (26') arises for the current density.

$$j(V=V_t+*\ln[\phi_1/C]+f*V_t+*\ln[\phi_2/\phi_1-(1-f)/f])=-j_{gen}*\phi_1/\phi_2*(1-f)/f \quad \text{equation (26')}$$

If the first intensity is measured in the second sub-region of the solar cell, which second sub-region is represented by diode 5 in accordance with FIG. 2, and the second intensity is measured according to the luminescence measurement in accordance with alternative B, the relationship in accordance with equation (27') arises for the current density.

$$j(V=V_t+*\ln[\phi_1/C]+(1-f)*V_t*\ln[f/(1-f)*(1+\phi_2/\phi_1)])=-j_{gen}*[1-\phi_1/\phi_2] \quad \text{equation (27')}$$

In one development of the method, the first sub-region is designed in the form of at least one first strip and the second sub-region is designed in the form of at least one second strip, wherein at least the first or the second strip is produced by projection owing to the impingement of excitation radiation on the solar cell.

The advantage in carrying out the method using at least one projected strip can be seen in the fact that the positions and the dimensions of at least the first and second sub-regions are freely definable. As a result, it is possible to carry out the method according to the invention on solar cells having various dimensions and manufacturing stages.

In order to produce the first and/or second strip, a projection device can be used. If the latter is equipped with an object recognition device, a solar cell to be tested can be arranged at an arbitrary position beneath the projection device. In this case, the position of the solar cell is recognized by the object recognition device. On the basis of the data which can be determined here by the object recognition device, the positions and dimensions of at least one of the strips can be adapted to the position and dimensions of the solar cell.

Preferably the first sub-region and the second sub-region are each distributed among a plurality of strips, such that e.g. in the case of a shaded first sub-region and a brightly illuminated second sub-region, this results in a strip pattern with an alternating intensity profile. Preferably, the sub-regions are distributed among a total of three to fifteen strips.

If the solar cell is tested in a state in which it has a superficial contacting structure in the form of metallization fingers or busbars, it is advantageous if the strips run substantially orthogonally to the metallization fingers and parallel to the busbars.

Preferably, f=0.5 and the intensity of the excitation radiation is 100 watts per square meter or f=0.05 and the intensity of the excitation radiation is 1000 watts per square meter.

In one advantageous development of the method, the total area of the solar cell and also preferably the area of the first sub-region and the area of the second sub-region are measured by an optical measuring device, in particular a matrix or linear-array camera, and the current density j is converted into a current intensity I, and the power density p=U*j is converted into a power P=U*I.

By measuring the total area of the solar cell and also the areas of the first and second sub-regions, it is possible for current densities that have already been determined to be converted into area-nonspecific current intensities, without the area ratio f having to be accurately known or set.

The optical measuring device, in particular matrix or linear-array camera, can be designed to recognize the contours and areas of the first sub-region and/or of the second sub-region completely in an automated manner. This can be done by the matrix or linear-array camera collecting image data that are input into an integrated or external computing unit. Since different sets of parameters having different illumination intensities or illumination wavelengths, for example, are manifested in correspondingly different gray-scale values or other image parameters, the dimensions of the sub-areas can be determined by means of digital image processing. If the sub-regions are formed in the form of projected strips, an edge recognition algorithm allows the recognition of the edge lengths and edge widths of all the strips present and thus also the calculation of the respective areas of the strips from the product of said edge lengths and edge widths.

The determination of the current intensity is advantageous since the current intensity constitutes a characteristic variable which is permitted to fluctuate only slightly between the solar cells which are intended to be interconnected to form a common module. In other words, if a plurality of current intensities are determined for a plurality of solar cells, these can be used for gripping sufficiently similar solar cells. The determination of the power affords the advantage that it constitutes an easily interpretable and easily comparable characteristic variable of solar cells.

In one advantageous development of the method, at the latest after the first and second luminescence measurements, a parameter variation and/or an area variation are/is carried out and a third luminescence measurement is carried out in addition to the first and second luminescence measurements, wherein a third intensity $\Phi_3$ of luminescent radiation emitted by the solar cell is measured, and wherein the third luminescence measurement is carried out according to the first luminescence measurement or the second luminescence measurement in accordance with alternative A or B, wherein the third luminescence measurement is carried out with a fifth set of parameters, which is different than in the first and/or the second luminescence measurement, and/or a second area ratio $f=f_2$, and the evaluation step involves determining a current density profile, in particular a current density-voltage characteristic curve, preferably a current-voltage characteristic curve.

The applicant's insight underlying this advantageous embodiment of the method is that variation of at least one of the sets of parameters and/or the first area ratio which underly the first and/or the second luminescence measurement makes it possible to determine a current density profile as a function of at least two voltage points.

For this purpose, the first and second luminescence measurements can be substantially repeated in the form of a third luminescence measurement, wherein in the third luminescence measurement a third intensity is measured analogously to the first intensity in the first luminescence measurement.

At least one of the sets of parameters in the first and second luminescence measurements is replaced by the fifth set of parameters. There are various possibilities for this parameter variation, and they are explained below.

A first possibility of the parameter variation comprises varying at least one parameter of the first or the second set of parameters, such that the fifth set of parameters arises instead of the first or second set of parameters. The difference in the sets of parameters can be manifested e.g. in the excitation spectrum or the illumination intensity. It is essential that the first or the second set of parameters is not varied in such a way that the fifth set of parameters corresponds to the first or the second set of parameters. As a result, an inhomogeneously illuminated solar cell is present in the case of arbitrary parameter variation in the third luminescence measurement.

The area variation can be effected in addition or as an alternative to the parameter variation. The area variation comprises varying the first and/or the second sub-area in which the first or respectively the second sub-region of the solar cell is impinged on by excitation radiation. The area variation can be effected by enlarging or reducing the first and/or second sub-area. The second area ratio arises analogously to the determination of the first area ratio in accordance with equation (22).

When carrying out the third luminescence measurement, the third intensity can be ascertained following the parameter variation and/or the area variation. The parameter variation and/or the area variation result(s) in either a difference between the third intensity and respectively the first or second intensity or however at least between the operating points to which the first and second intensities and also the third intensity can be assigned. It is essential that both the first and second intensities and also the third intensity can be assigned to a common current density-voltage characteristic curve of the tested solar cell.

This insight can easily be applied to equations (25)-(27): while a first current density and voltage at a first operating point can be determined by means of the first and second intensities, a further current density and a further voltage at a further operating point can be determined on the basis of the third intensity. On the basis of the two current densities and the resulting voltages, the current density-voltage characteristic curve of the solar cell can be at least linearly approximated. If the parameter variation and/or the area variation are/is repeated beyond the third luminescence measurement, then further current densities and voltages at further operating points can be determined.

With just one further measurement it is possible, as described below, to ascertain further quality information, in particular a further point on the current-voltage (IV) characteristic curve. One insight on the part of the applicant is that the intensities which are measurable in principle in the first luminescence measurement and the second luminescence measurement in accordance with alternative A or B can be expressed as a function of one another. In particular, an intensity not actually measured can be expressed as a function of two measured intensities and the underlying generation current densities (also short-circuit current densities).

If the first luminescence measurement was carried out with measurement of a first intensity in the second sub-region, wherein $\phi_1=\phi_{TB2}$ holds true, and the second luminescence measurement was carried out in accordance with alternative B, wherein $\phi_2-\phi_{hom}$ holds true, then it is possible to ascertain an intensity in the first sub-region $\phi_{TB1}$ in accordance with equation (28) below. In this case, $j_{genm\ TB2}$ is the generation current density present in the second sub-region in the first luminescence measurement, and $j_{gen,hom}$ is the generation current density present in the first and/or second sub-region of the solar cell in the second luminescence measurement in accordance with alternative B.

$$\phi_{TB1}=(j_{gen,TB2}/j_{gen,hom}*\phi_{hom}-\phi_{TB2})*f/(1-f) \quad \text{equation (28)}$$

By contrast, if the first luminescence measurement was carried out with measurement of a first intensity in the first sub-region, wherein $\phi_1-\phi_{TB1}$ holds true, and the second luminescence measurement was carried out in accordance with alternative B, wherein $\phi_2-\phi_{hom}$ holds true, then it is possible to ascertain an intensity in the second sub-region $\phi_{TB2}$ in accordance with equation (29) below. In this case, $j_{gen,TB2}$ is the generation current density present in the second sub-region in the first luminescence measurement, and $j_{gen,hom}$ is the generation current density present in the first and/or second sub-region of the solar cell in the second luminescence measurement in accordance with alternative B.

$$\phi_{TB2}=j_{gen,TB2}/j_{gen,hom}*\phi_{hom}-\phi_{TB1}*(1-f)/f \quad \text{equation (29)}$$

If the first luminescence measurement was carried out with measurement of a first intensity in the first sub-region, wherein $\phi_1=\phi_{TB1}$ holds true, and the second luminescence measurement was carried out with measurement of a second intensity in the second sub-region, wherein $\phi_2=\phi_{TB2}$ holds true, then it is possible to ascertain an intensity of luminescent radiation in the case of the solar cell impinged on homogeneously by excitation radiation $\phi_{hom}$ in accordance with equation (30) below. In this case, $j_{gen,TB2}$ and $j_{gen,hom}$ are the generation current densities present in the second sub-region in the first luminescence measurement and respectively in the second luminescence measurement in accordance with alternative B.

$$\phi_{hom}=[\phi_{TB2}+\phi_{TB1}*(1-f)/f]*j_{gen,hom}/j_{gen,TB2} \qquad \text{equation (30)}$$

When carrying out the third luminescence measurement, it is possible to use the relationships in accordance with equations (28)-(30) in order to determine the determinable quality information or in order to determine, in addition to an individual current density at one operating point, further current densities at other operating points and in particular to determine a current density-voltage characteristic curve and/or a current-voltage characteristic curve. This is preferably done by way of one of the three variants, described below, of the advantageous development concerning the third luminescence measurement.

In accordance with a first variant of the advantageous development concerning the third luminescence measurement, said third luminescence measurement is carried out according to the first luminescence measurement, wherein the third intensity is measured in the first sub-region of the solar cell. An additional operating point on the IV characteristic curve is preferably determined depending on the equivalent circuit diagram taken as a basis for the solar cell impinged on inhomogeneously by excitation radiation. In the case of an equivalent circuit diagram in which the first sub-region does not exhibit series resistance or exhibits series resistance only to a negligible degree (according to FIG. 1), equation 26 finds application, wherein the term $\phi_1$ is used instead of the term $\phi_1$. Assuming an equivalent circuit diagram in accordance with FIG. 2, equation 26' finds application, wherein the term $\phi_3$ is used instead of the term $\phi_1$. In the event of having carried out the first luminescence measurement and the second luminescence measurement in accordance with alternative A, it is possible to calculate $\phi_{hom}$ in accordance with the relationship according to equation (30), from the first two measured intensities $\phi_1$ and $\phi_2$ for a (freely) selectable $j_{gen,hom}$, and to use it as $\phi_2$ with $j_{gen,hom}$ as $j_{gen}$ in equation (26) or (26') for determining a further operating point. If the second luminescence measurement was carried out in accordance with alternative B (homogeneous impingement), the $\phi_2$ measured in the process can be used directly for equation (26) or (26') for determining a further operating point.

In accordance with a second variant of the advantageous development concerning the third luminescence measurement, said third luminescence measurement is carried out according to the first luminescence measurement, wherein the third intensity is measured in the second sub-region of the solar cell.

If the second luminescence measurement was carried out in accordance with variant A (the solar cell being impinged on exclusively inhomogeneously by excitation radiation), it is possible to calculate $\phi_{hom}$,, from the first two measured intensities $\phi_1$ and $\phi_2$ for a (freely) selectable $j_{gen,hom}$, and to use it as $\phi_2$ in equation (27) or (27') with $j_{gen,hom}$ as $j_{gen}$. Equation (27) finds application if an equivalent circuit diagram of a solar cell impinged on inhomogeneously by excitation radiation in accordance with FIG. 1 is assumed, while equation (27') is applied if an equivalent circuit diagram in accordance with FIG. 2 is assumed.

If the second luminescence measurement was carried out in accordance with alternative B (homogeneous impingement), the $\phi_2$ measured in the process can be used directly for equation (27) or (27') for determining a further operating point.

In accordance with a third variant of the advantageous development concerning the third luminescence measurement, the third luminescence measurement is carried out according to a second luminescence measurement in accordance with alternative B, wherein the third intensity is measured at an arbitrary position of the solar cell impinged on homogeneously by excitation radiation. A further point on the IV characteristic curve can be calculated in accordance with equation (26) or (26') (measurements in the first sub-region and with homogeneous illumination) or in accordance with equation (27) or (27') (measurements in the second sub-region and with homogeneous illumination), wherein the $\phi_3$ measured in the third luminescence measurement is used in each case for $\phi_2$. In the event of having measured $\phi_3$ in the first sub-region with $j_{gen,TB2}$ in the second sub-region, equation (26) or (26') is used for determining the further operating point. In the event of having measured $\phi_3$ in the second sub-region with $j_{gen,TB2}$, equation (27) or (27') is used. In each case it is possible to use 03 with $j_{gen,TB2}$ in the respective equation.

Even for the case in which the method is carried out in the absence of standard test conditions (STC, i.e. impingement with the AM1.5G-spectrum with an intensity of 1000 $W/m^2$ at a sample temperature of 25° C.), it is possible to specify the quality parameters, in particular current density and voltage for STC. By determining the varying generation current densities, it is possible to take account of the influence of their differences in the calculation of the current density as quality information. In this case, in particular, equation (26') changes into equation (26") presented below:

$$j(V)=j_{gen,STC}-j_{gen,h}+j_{gen,hom}*\phi_{TB1}/\phi_{hom}*(1-f)/f \qquad \text{equation (26")}$$

wherein $$V=V_t*\ln(\phi_{TB1}/C)+f*V_t*\ln\{j_{gen,h}/j_{gen,hom}*\phi_{hom}/\phi_{TB1}-(1-f)/f\}-(j_{gen,STC}-j_{gen,TB2})*V_t/j_{gen,hom}*\phi_{hom}/\phi_{TB1}*f*\ln\{j_{gen,h}/j_{gen,hom}*\phi_{hom}/\phi_{TB1}-(1-f)/f\}.$$

In this case, $j_{gen,STC}$ corresponds to the generation current density in the presence of standard test conditions.

In the above-described case concerning the standard test conditions, equation (27') changes into equation (27") presented below.

$$j(V)=j_{gen,STC}-j_{gen,hom}*\phi_{TB2}/\phi_{hom} \qquad \text{equation (27")}$$

wherein $$V=V_t*\ln(\phi_{TB2}/C)+V_t+*\ln(j_{sc,TB2}/j_{sc,hom}*\phi_{hom}/Q_{TB2}*f/(1-f)-f/(1-f))*(1-f)*[1+(j_{sc,STC}-j_{sc,TB2})/(j_{sc,TB2}-j_{sc,hom}*\phi_{TB2}/\phi_{hom})].$$

It lies within the scope of this advantageous development of the method that as many further luminescence measurements as desired, in particular at least one fourth luminescence measurement, can be carried out with correspondingly as many parameter variations and/or area variations as desired, in order to attain further current densities and voltages. As a result, over and above a linear approximation, the current density-voltage characteristic curve can also be approximated by nonlinear profiles.

Measurement of the quality-relevant total area enables the approximated current density-voltage characteristic curve to be converted into a current-voltage characteristic curve in a simple manner. With the current-voltage characteristic curve, the maximum power point of the solar cell can be determined in a simple manner at the point at which the characteristic curve has the maximum of the product of current (current intensity) and voltage. All the characteristic variables and characteristic curves can influence the quality information.

In one advantageous development of the method, the parameter variation comprises at least one intensity variation, such that the fifth set of parameters differs from at least one set of parameters of the first and/or second luminescence measurement in terms of at least one intensity, such that a series resistance-free Suns-$V_{oc}$ characteristic curve is at least partly determined and an area-related series resistance of the solar cell is determined depending on the first intensity and the second or third intensity and a current-voltage characteristic curve is preferably determined depending on the series resistance and the series resistance-free Suns-$V_{oc}$ characteristic curve.

What is essential to this development of the method is that the parameter variation comprises an intensity variation, such that the fifth set of parameters is different than at least one set of parameters of the first and/or second luminescence measurement in terms of at least one illumination intensity.

If at least one fourth luminescence measurement is additionally repeated with further intensity variations, a fourth intensity can be determined and all the measured intensities can be plotted as a function of the illumination intensity in a common graph. This results in a so-called Suns-PL characteristic curve, the determination of which is known in principle from "Trupke, Thorsten & Bardos, RA & Abbott, Malcolm & Cotter, J. (2005). Suns-photoluminescence: Contactless determination of current-voltage characteristics of silicon wafers. Applied Physics Letters. 87. 10.1063/1.2034109.".

If the solar cell is under open-circuit conditions when an additional luminescence measurement is carried out, a fourth intensity □□ can be expressed as a function of a varying open-circuit voltage taking into account the relationship according to equation (28).

$$\phi_4 = C^* \exp(V_{OC}/V_t) \qquad \text{equation (28)}$$

By virtue of the dependence of the intensity on the open-circuit voltage, the intensities of the Suns-PL characteristic curve can be converted into a Suns-$V_{oc}$ characteristic curve in a simple manner by rearranging equation (28) with respect to the open-circuit voltage. This constitutes familiar quality information of solar cells. The applicant's further insight underlying this advantageous development of the invention stems from the fact that the series resistance of the solar cell can be determined on the basis of the first and second measured intensities.

The ohmic resistance underlying the series resistance of the solar cell can be described on the basis of the equivalent circuit diagram of a solar cell impinged on inhomogeneously by excitation radiation. In this case, the relationship in accordance with equation (29) holds true.

$$r_s = (V_{TB1} - V_{TB2})/j_{TB1} \qquad \text{equation (29)}$$

In this case, $r_s$ corresponds to the area-related series resistance of the solar cell, while the difference ($V_{TB1}$−$V_{TB2}$), on the basis of Kirchhoff's voltage law, corresponds to the voltage drop across the area-related series resistance. It is assumed here as a simplification that the areas of the two sub-regions are identical and the first area ratio is f=0.5. However, it lies within the scope of the advantageous development of the method that the first area ratio f can assume an arbitrary value.

On the basis of the applicant's calculations underlying the advantageous development of the method, it is possible to express the right-hand term of equation (29) as a function of the first and second intensities. However, the sub-regions in which the first and second intensities are determined and the method variant in accordance with which the method is carried out should be taken into account in that case. This finds expression in the case differentiation described below.

If the first intensity is determined in the first sub-region of the solar cell which is represented as the first diode 4 in the equivalent circuit diagram in accordance with FIG. 1 or 2, and the second intensity is measured in the second sub-region which is represented by the second diode 5, the area-related series resistance arises according to the relationship in accordance with equation (30).

$$r_s = V_t/j_{gen}*(\phi_2+\phi_1)/2/\phi_1*\ln(\phi_2/\phi_1) \qquad \text{equation (30)}$$

If the first intensity is measured in the first sub-region of the solar cell which is represented by the first diode 4 in the equivalent circuit diagram in accordance with FIG. 1 or 2, and the second intensity is measured with the solar cell being impinged on homogeneously by means of the second luminescence measurement in accordance with alternative B, the area-related series resistance arises according to the relationship in accordance with equation (31).

$$r_s = V_t/j_{gen}*\ln(\phi_2/\phi_1-1)/2*(\phi_2/\phi_1) \qquad \text{equation (31)}$$

If the first intensity is measured in the second sub-region of the solar cell which is represented by the first diode 5 in the equivalent circuit diagram in accordance with FIG. 1 or 2, and the second intensity is measured with the solar cell being impinged on homogeneously by means of the second luminescence measurement in accordance with alternative B, the area-related series resistance arises according to the relationship in accordance with equation (32).

$$r_s = V_t/j_{gen}*\ln(\phi_2/\phi_1-1)/2/(\phi_1/\phi_2-1) \qquad \text{equation (32)}$$

Consequently, the series resistance can be determined as a function of the first and second intensities in all the described alternatives for carrying out the first and second luminescence measurements.

For determining the series resistance it is advantageous if the thermal voltage $V_t$ and the generation current density $j_{gen}$ are estimated in accordance with equations (30)-(32) or are determined by means of reference measurements for a multiplicity of tested solar cells, such that the series resistance is unambiguously determinable.

The Suns-$V_{oc}$ characteristic curve determined can be converted into a current-voltage characteristic curve in a simple manner by way of the series resistance determined. The Suns-$V_{oc}$ characteristic curve initially describes the relationship between open-circuit voltage $V_{oc}$ and incident intensity E. This is converted into a current density-$V_{oc}$ characteristic curve by each incident radiation E being assigned a current density j in accordance with the following specification, $$j = (E-1)*j_{gen} \qquad \text{equation (33)}$$

where $j_{gen}$ describes the generation or short-circuit current density.

Afterward, the associated voltage V for the actual current-voltage characteristic curve is calculated from the open-circuit voltage $V_{oc}$ with the aid of the current density j and the series resistance r's.

$$V = V_{oc} + r_s*j \qquad \text{equation (34)}$$

In one advantageous development of the method, in addition to the first and second luminescence measurements, a contactless reflection measurement is performed on the solar cell, wherein the solar cell is impinged on by excitation radiation having a plurality of wavelengths and radiation reflected by the solar cell is measured, depending on which radiation a spectral reflection is determined, and the quality information is dependent on the first intensity, the second intensity and the spectral reflection.

The reflection measurement is a contactless method requiring only a short time in order to characterize the solar cell with regard to its reflectivity in the form of a reflectance. In this case, the spectral reflection describes the wavelength-dependent reflectance of the solar cell. Determining the spectral reflection allows estimation or determination of those wavelengths in the impingement of excitation radiation at which optical losses may occur.

In the simplest embodiment, the spectral reflection determined is included as an additional parameter in the quality information. In the evaluation step, the spectral reflection can be used in combination with the first and second intensities in order to assign the solar cell to a quality class. Such an assignment can be effected in a simple manner by means of an arbitrary assignment specification, e.g. in the form of a table or a mathematical equation.

In one advantageous development of the method, in which a reflection measurement is carried out, in the evaluation of the quality information, a mathematical model is adapted to the spectral reflection, more precisely to the escape reflection, by means of a parameterization, wherein a wavelength-dependent generation proportion of the radiation impinging on the solar cell is calculated and the wavelength-dependent generation proportion is subjected to mathematical convolution with a predefined excitation spectrum and a generation current density $j_{gen}$ is determined therefrom.

The mathematical model can be a wavelength-dependent function equation which is describable by a set of parameters. This mathematical model can as necessary correspond at least partly to a polynomial of arbitrary degree. The model can likewise have some other predefined function time, e.g. in the form of a logistic or exponential function. On the basis of the wavelength-dependent spectral reflection determined, for the mathematical model boundary conditions can be predefined which determine concrete values or value profiles for the parameters of the mathematical model. The mathematical model is thereby parameterized. "P. A. Basore, "Extended spectral analysis of internal quantum efficiency," *Conference Record of the Twenty Third IEEE Photovoltaic Specialists Conference*—1993 (Cat. No. 93CH3283-9), Louisville, KY, USA, 1993, pp. 147-152, doi: 10.1109/PVSC.1993.347063." discloses a mathematical model that is highly suitable for an approximation of the spectral reflection.

The wavelength-dependent generation proportion of the radiation incident on the solar cell can be determined on the basis of the parameterized mathematical model. That is based on a procedure which is known in principle from "Fell, Andreas & Wirtz, Wiebke & Hoffler, Hannes & Greulich, Johannes. (2019). Determining the Generation Rate of Silicon Solar Cells from Reflection and Transmission Measurements by Fitting an Analytical Optical Model. 3037-3041. 10.1109/PVSC40753.2019.8980730.".

By subjecting the wavelength-dependent generation proportion to convolution with the spectrum according to which the solar cell is impinged on by excitation radiation in the reflection measurement, a generation current density can be determined in a simple manner. The excitation spectrum preferably corresponds to a predefinable light spectrum, preferably an AM1.5 spectrum, which at least partly corresponds to the light spectrum of the sun. As a result, in the reflection measurement, it is possible to establish illumination conditions which may also be present during real operation of the solar cell in the field. The excitation radiation is generated by an illumination means, wherein different types of illumination means can generate different excitation spectra. The properties of the excitation spectrum can thus be influenced by the choice of an illumination means. It likewise lies within the scope of the advantageous development that, particularly if specifications of an illumination means are not sufficiently known, the excitation spectrum is assumed, estimated or determined by means of spectrography.

The generation current density can influence firstly the quality information, but secondly also the determination of the current densities. As a result, the calculation of the current density as quality information of the solar cell cannot be effected depending on an estimated generation current density, but rather depending on an exactly ascertained generation current density.

In one advantageous development of the method, in the reflection measurement, the excitation radiation is generated and/or the reflected radiation is captured at least partly by means of an Ulbricht sphere. A spectrometer captures at least the reflected radiation and outputs a spectral reflection, which is subjected to mathematical convolution with the excitation spectrum in the evaluation step in order to determine a reflected photon flux, such that the quality information is dependent on the reflected photon flux.

In the present case, the Ulbricht sphere constitutes a device which can be used firstly in part for generating a diffuse illumination of the solar cell and/or secondly for capturing the reflected radiation. The Ulbricht sphere comprises a hollow sphere, having a light entrance opening and an exit opening, which are generally arranged at right angles to one another. The inside of the hollow sphere is coated with a diffusely reflective surface, e.g. with barium sulfate or polytetrafluoroethylene.

If the Ulbricht sphere is used at least in part to generate excitation radiation for the reflection measurement at the solar cell, a radiation source is arranged upstream of the light entrance opening of the Ulbricht sphere. The radiation source generates a light beam which enters the Ulbricht sphere, undergoes multiple reflection inside the latter and emerges as diffuse excitation radiation through the exit opening. The exit opening faces in the direction of the solar cell at which the excitation radiation is reflected for the reflection measurement.

If the Ulbricht sphere is used at least in part to capture reflected radiation, its light entrance opening faces in the direction of the solar cell, such that the reflected radiation enters the Ulbricht sphere and leaves the latter through the exit opening.

It lies within the scope of the invention that the same Ulbricht sphere is used at least in part both for generating the excitation radiation and for capturing the reflected radiation. In this case, the openings described are each used simultaneously both as entrance and as exit openings.

The spectrometer can be used both for determining the excitation spectrum and for determining the spectral reflection. Convolution of the excitation spectrum and the spectral reflection allows the reflected photon flux to be determined in a simple manner. Said photon flux, in addition to the quality-relevant characteristic variables of the solar cell that have already been described, can influence the quality information determined.

In one advantageous development of the reflection measurement, the excitation radiation is generated at least partly by means of at least one diode, preferably dome illumination by a plurality of diodes. An optical measuring device captures the reflected radiation, with which the spectral reflection is determined. By means of a calibration of the optical measuring device, a reflected photon flux is determined depending on the spectral reflection.

The diode is a light-emitting diode (LED). The latter can be of single- or multicolor design. A plurality of LEDs can likewise be provided, each of which is designed to generate excitation radiation of one or more wavelengths. Suitable control of the diodes enables the excitation spectrum of the excitation radiation to be established in a simple manner, such that the excitation radiation does not have to be captured by a spectrometer or a similar measuring device. Instead, the excitation spectrum can be designed as an adjustable variable.

The plurality of LEDs can be arranged within the dome illumination. The dome illumination, in a similar manner to the set-up of the Ulbricht sphere, comprises a half-shell having a diffusely reflective surface on its concave inside. The plurality of LEDs can be arranged on the edge of the half-shell, and they illuminate the inside of the half-shell. As a result of the diffuse reflection, excitation radiation of one or more specific wavelengths impinges on the solar cell over a large area.

The optical measuring device can be arranged in direct proximity to the LED or within the dome illumination in a recessed part of the hollow shell. The optical measuring device can be designed as a linear-array or matrix camera. That is advantageously the same linear-array and matrix camera used for determining the first and second sub-areas in one of the luminescence measurements carried out.

The optical measuring device is designed to capture the reflective radiation. Synchronization with the control of the LED and/or dome illumination makes it possible, in particular, to capture the reflected radiation depending on a wavelength. In this case, the intensity of the reflected radiation can be determined. Given a known illumination intensity, which can be ascertained e.g. by means of a simultaneously illuminated and detected white or gray standard, the spectral reflection can be determined together with the intensity of the reflected radiation.

Calibration of the optical measuring device enables the reflected photon flux to be deduced on the basis of the spectral reflection. The advantage in using an optical measuring device for determining the spectral reflection and/or the reflected photon flux is that easily designable means pertaining to optical metrology in combination with digital image processing can be used to gather quality information about the solar cell.

In one advantageous development of the method, the parameter variation comprises at least one wavelength variation, such that the fifth set of parameters in the third luminescence measurement is different than at least one set of parameters of the first and second luminescence measurements in terms of at least one wavelength, preferably a wavelength range. The evaluation step involves calculating a wavelength-dependent absolute internal quantum efficiency (aIQE) depending on a relative external quantum efficiency (rEQE) and the spectral reflection, wherein for at least one varied wavelength, preferably for a varied wavelength range, particularly preferably between 600 and 800 nm, a value, preferably 1=100%, for the absolute internal quantum efficiency is predefined and the absolute external quantum efficiency is ascertained preferably proceeding from the absolute internal quantum efficiency, and a generation current density is preferably determined depending on said absolute external quantum efficiency.

The relative external quantum efficiency arises, in a manner that is known in principle, on the basis of the first or the second luminescence measurement with the solar cell being impinged on inhomogeneously by excitation radiation. This is known from "K. O. Davis et al.: Electroluminescence Excitation Spectroscopy: A Novel Approach to Non-Contact Quantum Efficiency Measurements; 2017 *IEEE 44th Photovoltaic Specialist Conference* (*PVSC*), Washington, D C, 2017, pp. 3448-3451, doi: 10.1109/PVSC.2017.8366170.". Advantageously, the first sub-area is shaded in this case, while the second sub-area is illuminated with an intensity of greater than zero $W/m^2$, and the first or second intensity is determined in the first sub-area. Given a known wavelength, the relative external quantum efficiency can thus be determined as a function of a first wavelength initially on the basis of the first or second luminescence measurement.

In accordance with this advantageous development of the method, according to the procedure already described, a parameter variation is carried out, wherein the wavelength of at least the first, second, third or fourth set of parameters is varied. This yields a fifth set of parameters, which, upon the third luminescence measurement being carried out, takes the place of the set of parameters whose wavelength was varied. The possibilities for the parameter variation have been described in regard to the basic possibilities for carrying out the third luminescence measurement and analogously hold true for the wavelength variation.

The wavelength variation has the consequence that at least the third intensity was measured at a different wavelength than the first or the second intensity. A further relative external quantum efficiency can thus be determined on the basis of the third intensity. This yields a wavelength-dependent relative external quantum efficiency.

The wavelength-dependent relative external quantum efficiency can be converted into a wavelength-dependent relative internal quantum efficiency by means of division by a characteristic value that is dependent on the spectral reflection.

On the basis of the wavelength-dependent relative internal quantum efficiency, it is possible in turn to determine the absolute internal quantum efficiency by assuming that the relative internal quantum efficiency is 100% for at least one wavelength or a wavelength range. This is an important insight on the part of the applicant with regard to the advantageous development of the method.

With the described assumption regarding the relative internal quantum efficiency, the latter can be linearly converted into the absolute internal quantum efficiency. Renewed conversion using a characteristic value that is dependent on the spectral reflection enables the absolute external quantum efficiency to be deduced proceeding from the absolute internal quantum efficiency.

The absolute external quantum efficiency constitutes a parameter which may influence the quality information of a tested solar cell. Advantageously, on the basis of the absolute external quantum efficiency, it is possible to determine the short-circuit current density $j_{sc}$ or the generation current density $j_{gen}$ in accordance with equation (35).

$$j_{gen}=\int\varphi(\lambda)EQE(\lambda)d\lambda \qquad \text{equation (35)}$$

In this case, $\varphi(\lambda)$ is a photon flux incident on the solar cell and $EQE(\lambda)$ is the absolute external quantum efficiency determined. The photon flux incident on the solar cell can be the photon flux estimated in accordance with the AM1.5 spectrum or can be determined e.g. by means of a monitor diode. As a result, the generation current density $j_{gen}$ can be ascertained exactly and used for determining a current density which can preferably constitute quality information.

In a further embodiment of the method, the evaluation step is effected using a model equation and/or a prediction model in order to determine the quality information.

The model equation is a mapping specification that outputs abstract quality information, e.g. a quality degree or a quality class, and/or concrete quality information, e.g. current density or power, at least as a function of the first intensity and the second intensity. Said mapping specification can be represented by a polynomial, for example. Said polynomial can have an arbitrary form, in principle, which is determined by a set of parameters. Before the quality assessing method is carried out, the parameters can be determined e.g. by carrying out experiments in accordance with a full factorial design of experiments and subsequent regression.

The prediction model can be determined wholly or partly on the basis of a machine learning algorithm, empirical prediction models, such as artificial (convolutional) neural networks. The latter, in a similar manner to the parameterization of the model equation, can be determined e.g. by supervised learning (training). In contrast to the model equation, the structure of the prediction model need not be predefined, but rather may arise autonomously on the basis of the supervised learning.

An empirical prediction model is preferably based on measurement pairs, each comprising an input and a quality parameter, which preferably represents quality information of the solar cell. The prediction model has dedicated model parameters which map a dependence of quality information on the input. In a learning phase, the model parameters are optimized to the effect that this allows the quality parameters to be predicted as accurately as possible depending on the inputs. In this case, a prediction error is reduced e.g. by means of numerical methods such as gradient descent methods. A trained model can thereupon calculate quality parameters depending on the input. Analytical models can likewise be integrated into the calculation process.

The prediction model can consist of a pure learning model that is optimized with regard to one or more items of quality information. The overall model preferably consists of a combination of learned models or a combination of learned and analytical models. In this case, the outputs and intermediate calculations of the models can be used as input for further models. These results can themselves be quality parameters which preferably represent quality information and are used for model optimization. The parameters of the overall model and of all sub-models can be optimized on the basis of the deviation of the prediction results from the quality parameters. The sub-models are preferably designed to calculate physical variables that are used further in subsequent steps of the overall model. Furthermore, latent model parameters, as input parameters, can also influence the calculation steps of the subsequent models. Models can likewise share common parameters. The measurement data can be linked before the processing or after intermediate calculations, e.g. by means of a concatenation of the data or a mathematical computation.

Empirical models are preferably derived from analytical models or simulation models. This has the advantage of a fast calculation, and of description by way of a derivable function. For this purpose, the analytical models or simulation models are evaluated at interpolation points and a function is fitted to the data. Such a procedure is known e.g. from Wasmer, Sven, Andreas A. Brand, and Johannes M. Greulich. "Metamodeling of numerical device simulations to rapidly create efficiency optimization roadmaps of monocrystalline silicon PERC cells." Energy Procedia 124 (2017): 207-214. The model function can contain calibration parameters that can be adapted during the training of the model.

The choice of the sequence of at least the first and second luminescence measurements and the manifestations of the parameters of the sets of parameters used here, e.g. shading location, can be optimized with regard to the prediction accuracy of the model.

The invention also relates to a device for contactlessly assessing the quality of a solar cell, with a first measurement configuration and a second measurement configuration, wherein the device in the first measurement configuration is designed, by means of a radiation source, to shade a first sub-region of the solar cell or to cause excitation radiation to impinge on said first sub-region in accordance with a first set of parameters and to cause excitation radiation to impinge on a second sub-region of the solar cell in accordance with a second set of parameters, which is different than the first set of parameters, and, by means of a detector device, to measure a first intensity of luminescent radiation emitted by the solar cell in the first sub-region or in the second sub-region, and wherein the device in the second measurement configuration is designed, by means of the radiation source, to cause excitation radiation to impinge on the second sub-region of the solar cell in accordance with a third set of parameters, which is different than the first set of parameters, and to shade the first sub-region of the solar cell or to cause excitation radiation to impinge on said first sub-region in accordance with the first set of parameters and, by means of the detector device, to measure a second intensity in the respective other sub-region relative to the first measurement configuration, or wherein the device in the second measurement configuration is designed, by means of the radiation source, to cause excitation radiation to impinge homogeneously on the solar cell in the first and second sub-regions in accordance with a fourth set of parameters, and the detector device is designed to measure the second intensity in the first sub-region and/or the second sub-region, and wherein the detector device is connected to a computing unit in terms of signaling, wherein the computing unit is designed to determine quality information depending on the first intensity and the second intensity.

Advantageously, the quality assessing device is designed to carry out the method according to the invention. In one advantageous development, the device has means designed to carry out one or more advantageous developments of the method according to the invention.

BRIEF DESCRIPTION OF THE DRAWINGS

Further preferred features and embodiments of the method according to the invention and of the device according to the invention are explained below on the basis of exemplary embodiments and the figures. The exemplary embodiments are merely advantageous embodiments of the invention and non-limiting.

In the figures.

DETAILED DESCRIPTION

Figure 1:
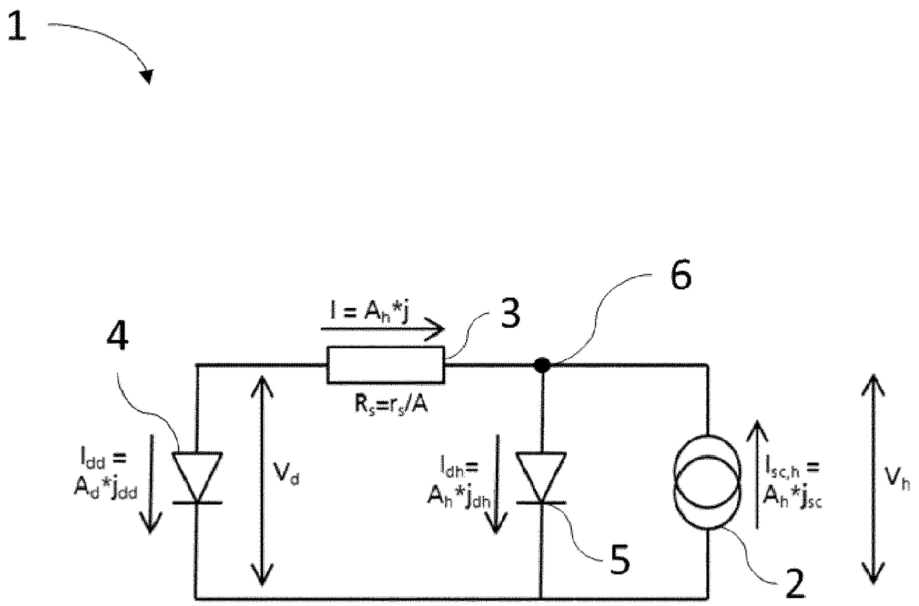
FIG. 1 shows a first equivalent circuit diagram of a solar cell impinged on inhomogeneously by excitation radiation.

FIG. 1 shows an equivalent circuit diagram of an uncontacted and inhomogeneously exposed solar cell 1. This diagram is based on the model-related assumption that the solar cell 1 has a doped semiconductor structure with a pn junction, such that a current flow $I_{sc,h}$ is generated in the event of incident light radiation. This is represented by the current source 2, which outputs the electric current $I_{sc}$ with a short-circuit current density $j_{sc}$ (also called generation current density: $j_{gen}$) underlying said current.

The solar cell 1 has an area-related series resistance, which is represented by the ohmic resistance 3 in the equivalent circuit diagram of the inhomogeneously illuminated solar cell.

In the equivalent circuit diagram shown, a first sub-region of the solar cell is shaded, such that the solar cell is illuminated by an excitation radiation intensity of approximately 0 watts per square meter in this region. A second sub-region of the solar cell is impinged on by excitation radiation having an intensity of greater than 0 watts per square meter.

Owing to the difference in the illumination intensities, a current flow takes place from the second sub-region of the solar cell into the first sub-region of the solar cell. In this case, a first diode 4 at least partly represents the first sub-region of the solar cell and diode 5 at least partly represents the second sub-region of the solar cell.

According to the model-related assumption underlying the equivalent circuit diagram in accordance with FIG. 1, the generated current $I_{sc,h}$ flows to a node 6 of the equivalent circuit diagram, at which said current is divided between the first and second sub-regions.

The proportion of the current $I_{sc,h}$, which flows through diode 4, has a current intensity Ida which is dependent on the current density jaa in the diode 4 and the shaded area Aa of the first sub-region. Equation (36) holds true.

$$I_{dd}=A_d*j_{dd} \qquad \text{equation (36)}$$

Equation (37) holds true for the current density $j_{dd}$.

$$j_{dd}=j_0*\exp(V_d/V_t) \qquad \text{equation (37)}$$

In accordance with equation (37), $j_0$ is the saturation current density of the diode, $V_t$ is the thermal voltage of the solar cell, and $V_d$ is the voltage present in the shaded sub-region of the solar cell.

For the illuminated part of the solar cell which is represented by the diode 5, the relationship in accordance with equation (38) holds true for the current, wherein $I_{dh}$ is the current intensity of the current through the second diode, $A_h$ is the area of the second sub-region impinged on by excitation radiation, and $j_{dn}$ is the current density of the current $I_{dh}$.

$$I_{dh}=A_h*j_{dh} \qquad \text{equation (38)}$$

Equation (39) holds true for the current density $j_{dh}$.

$$j_{dd}=j_0*\exp(V_d/V_t) \qquad \text{equation (39)}$$

In this case, $j_0$ is the saturation current density of the diode, $V_t$ is the thermal voltage of the solar cell, and $V_h$ is the voltage pre sent in the illuminated second sub-region of the solar cell.

In order to determine the quality of the solar cell 1, a first intensity of the solar cell and a second intensity of the solar cell are measured by carrying out a first luminescence measurement and a second luminescence measurement. A first possibility here consists in implementing the first intensity and the second intensity in the first luminescence measurement and the second luminescence measurement, respectively, on the basis of the inhomogeneously exposed solar cell.

Figure 2:
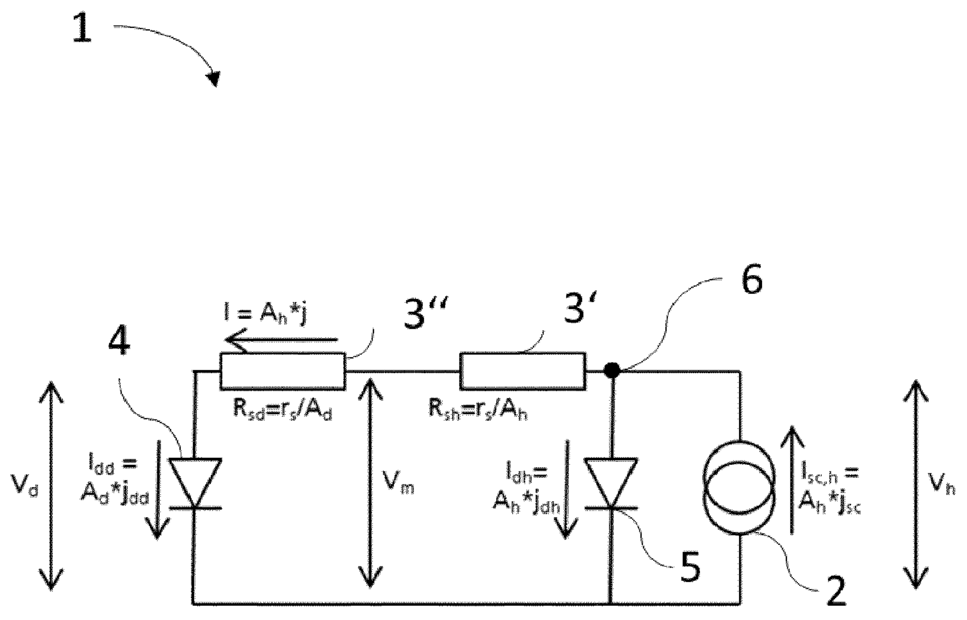
FIG. 2 shows a second equivalent circuit diagram of a solar cell impinged on inhomogeneously by excitation radiation.

FIG. 2 likewise shows an equivalent circuit diagram of an inhomogeneously exposed solar cell 1. The equivalent circuit diagram in accordance with FIG. 2 is constructed analogously to the equivalent circuit diagram in accordance with FIG. 1, but differs therefrom in that two ohmic resistances 3' and 3" connected in series are arranged instead of one ohmic resistance 3. This takes account of the applicant's insight that not just the first sub-region of the solar cell exhibits a series resistance, but the second sub-region of the solar cell does as well. Overall, the equivalent circuit diagram in accordance with FIG. 2 obtains a higher degree of detail than the equivalent circuit diagram in accordance with FIG. 1 and thereby represents the actual electrical properties of a solar cell to a higher level than the equivalent circuit diagram in accordance with FIG. 1.

Figure 3:
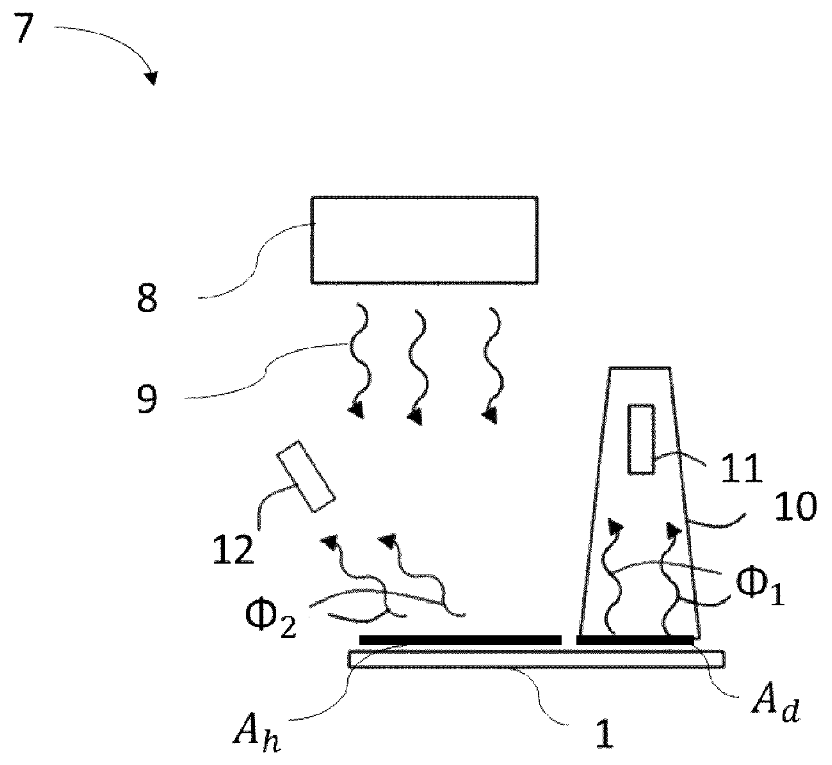
FIG. 3 shows a first measurement configuration of a device for assessing the quality of solar cells.

FIG. 3 shows a first measurement configuration 7, with which the first luminescence measurement and the second luminescence measurement are effected simultaneously. In this case, an illumination device 8 illuminates the solar cell 1 with excitation radiation 9 in the second sub-region, which has an area corresponding to that of the sub-area $A_h$ in accordance with FIG. 1 or FIG. 2. In addition, the solar cell is shaded in a different, first sub-region with a truncated cone 10, in which a detector in the form of a first InGaAs photodiode 11 is arranged. A second InGaAs photodiode 12 is arranged in the region of the brightly illuminated sub-region.

In the measurement configuration 7 shown, the area of the first sub-region Ad in relation to a total area of the solar cell has a ratio 1-*f*, which can be varied in a simple manner by way of the dimensions of the truncated cone 10.

Impingement of excitation radiation on the solar cell 1 results in the emission of luminescent radiation both in the first and in the second sub-area $A_d$ and $A_h$ of the solar cell. In this case, the first intensity $\phi_1$ is measurable in the first sub-region, while the second intensity $\phi_2$ is measurable in the second sub-region. The first intensity $\phi_1$ is measured by the first InGaAs photodiode 11 and the second intensity $\phi_2$ is measured by the second InGaAs photodiode 12. On the basis of the model-related assumptions concerning the inhomogeneously illuminated solar cell in accordance with FIG. 2, the current density j and the voltage V of the current density-voltage characteristic curve can be determined as a function of the measured intensities $\phi_1$ and $\phi_2$, the area ratio f and the short-circuit current density jse in accordance with equation (40).

$$j(V=V_m=f*V_t*\ln[\phi_2/C]+(1-f)*V_t+*\ln[\phi_1/C])=-j_{sc}*(1-f)/(1-f+f*\phi_2/\phi_1) \qquad \text{equation (40)}$$

In this case, the short-circuit current density $j_{sc}$ (also called generation current density $j_{gen}$) can correspond to an estimated value or can be determined by means of an additionally implemented reflection measurement (not shown). Given areas $A_h$ and $A_d$ that are equal in magnitude, the area ratio f in accordance with equation (40) is 0.5.

Figure 4:
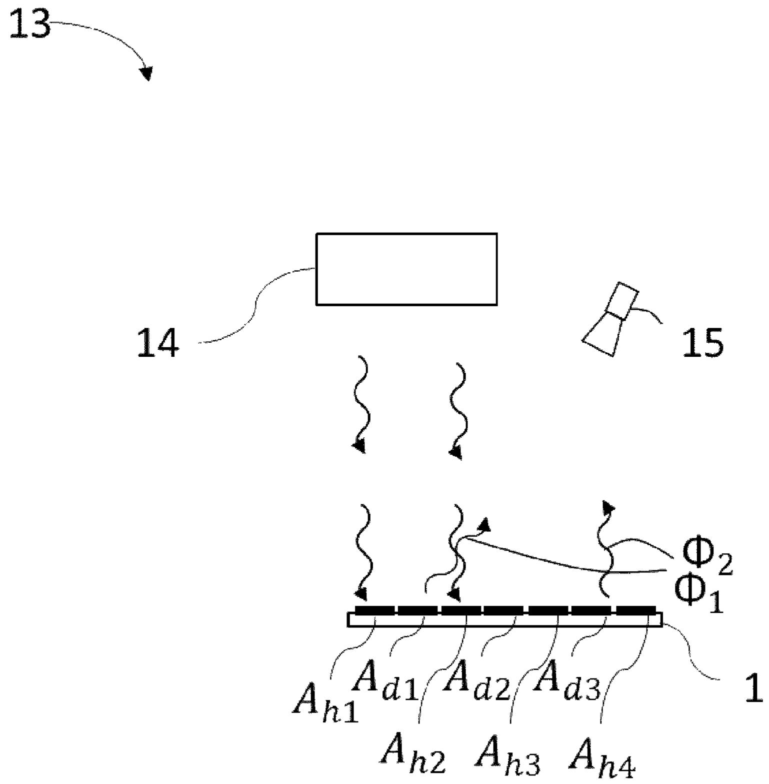
FIG. 4 shows a second measurement configuration of a device for assessing the quality of solar cells.

FIG. 4 shows an alternative measurement configuration 13, in which, just like in the first measurement configuration 7, the first luminescence measurement and the second luminescence measurement are effected within a common measurement step. In contrast to measurement configuration 7, measurement configuration 13 comprises a projection device 14, by means of which the solar cell can be segmented into a plurality of sub-regions. In particular, the area $A_d$ of the first sub-region can be divided among a plurality of sub-areas $A_{d1}$-$A_{d3}$ and the area $A_h$ of the second sub-region can be divided into a plurality of sub-areas $A_{h1}$-$A_{h4}$.

What is essential to the exemplary embodiment shown is that the projected sub-areas of the group comprising $A_{d1}$-$A_{d3}$ are impinged on by excitation radiation of a common set of parameters, while the projected sub-areas $A_{h1}$-$A_{h4}$ are impinged on by excitation radiation in accordance with a different set of parameters. As a result, a current flow is generated in the solar cell, which flows between the areas $A_d$ and $A_h$ of the first and second sub-regions, and also their respective sub-areas, according to the explanations regarding FIGS. 1 and 2.

A matrix or linear-array camera 15 is designed to capture the total area of the solar cell 1. In this case, an integrated processor (not shown) is used to determine the size of each of the sub-areas $A_{d1}$-$A_{d3}$ and $A_{h1}$-$A_{h4}$. The matrix or linear-array camera 15 is likewise designed to measure the intensities $\phi_1$ and $\phi_2$. Taking equation (40) into account, it is thus likewise possible to determine a current density as a function of the first and second intensities and the area ratio f. Determining the areas makes it possible for the current density determined in the process to be converted into a current I.

The projection device 14 allows a flexible adjustability of the parameters for illuminating the solar cell 1 and also the respective sub-areas $A_{d1}$-$A_{d3}$ and $A_{h1}$-$A_{h4}$. Such a flexible adjustment can be advantageous in particular in various production stages of the solar cell 1. How this affects the first and second luminescence measurements is shown in FIG. 5.

Figure 5:
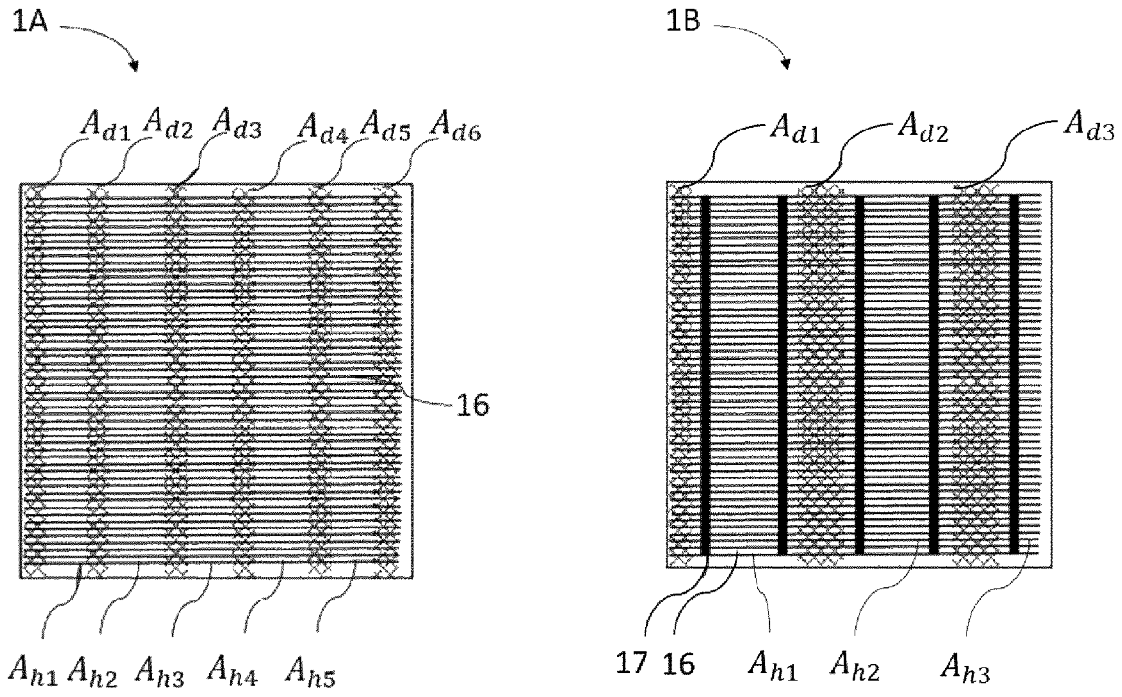
FIG. 5 shows two manufacturing stages of a solar cell during a quality assessment.

FIG. 5 shows by way of example the implementation of the measurement method according to the measurement configuration 13 on the solar cell 1, which can be present according to two manufacturing stages in the form of a solar cell 1A or a solar cell 1B.

The solar cell 1A has a plurality of applied metallization fingers 16 on its surface. Said metallization fingers serve to enable a generated current to be conducted away. In contrast to FIG. 3, the projected sub-area $A_h$ is subdivided into five segments $A_{h1}$-$A_{h5}$. The projected sub-area $A_d$ is subdivided into six segments $A_{d1}$-$A_{d6}$. The arrangement shown results in a strip pattern resulting from the totality of all the segments. The metallization fingers 16 run transversely with respect to all the projected segments $A_{h1}$-$A_{h5}$ and $A_{d1}$-$A_{d6}$.

The solar cell 1B has a total of five busbars 17 on its surface, besides the metallization fingers 16. In contrast to the quality inspection of the solar cell 1A, the position of the busbars is taken into account in the projection of the segments of which the sub-areas $A_d$ and $A_h$ are composed. This affects firstly the number and secondly the position of the segments, such that the sub-area Aa has three segments $A_{d1}$-$A_{d3}$ running in the form of strips parallel to the busbars 17. The sub-area $A_h$ likewise comprises three strip-shaped segments $A_{h1}$-$A_{h3}$ likewise running parallel to the busbars. The segments are each laterally delimited by two busbars 17. This has the advantage that a current flow within the solar cell 1 causes an injection or extraction of charge carriers at the busbars 17.

Figure 6:
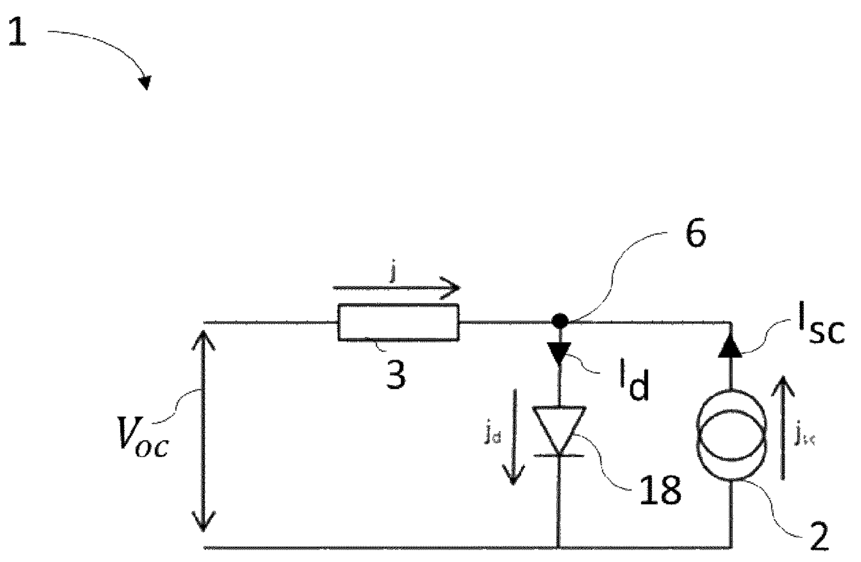
FIG. 6 shows an equivalent circuit diagram of a solar cell impinged on homogeneously by excitation radiation.

As an alternative to the quality assessment according to the descriptions concerning FIGS. 1 to 5, a solar cell can be tested by being impinged on homogeneously by excitation radiation. The requisite evaluation steps are based on a model-related assumption concerning a solar cell impinged on homogeneously by excitation radiation, the equivalent circuit diagram of which differs from the equivalent circuit diagrams in accordance with FIG. 1 and FIG. 2. This can be seen in FIG. 6.

The illuminated region of the solar cell 1 impinged on homogeneously by excitation radiation is represented by a current source 2. The current flow of the current source 2 thus represents the generation current that is generated as a result of absorption of the excitation radiation and charge carrier separation in the solar cell. A third diode 18 is connected in parallel with the current source 2.

Although a voltage, the so-called open-circuit voltage $V_{oc}$ (also called: no-load voltage), is present at the electrodes of the solar cell 1, no external current flows. The charge carrier pairs generated in the solar cell as a result of absorption of the excitation radiation recombine approximately substantially at the same location, and so disregarding considerable local defects, no currents or only currents of low current intensity flow in the solar cell under an open-circuit condition. This is represented by the current $I_d$ that flows through the diode 18. In this case, the current $I_d$ has a current density ja.

Owing to the assumption that no current flows between the electrodes of the solar cell, the entire generation current $I_{sc}$, owing to the third diode 18 and the current source 2 being connected in parallel, flows to a good approximation through the third diode 18. This means that the charge carriers of the current $I_{sc}$ recombine in the illuminated region of the solar cell 1. This is represented by a diode current $I_d$ having a current density $j_d$ that flows through a diode 18.

The solar cell impinged on homogeneously by excitation radiation is of relevance to the determination of the quality of the solar cell since the first luminescence measurement can be carried out on the basis of an inhomogeneously illuminated solar cell, while the second luminescence measurement is able to be carried out with homogeneous illumination of the solar cell. The way in which this can be realized is shown in FIGS. 7 and 8.

Figure 7:
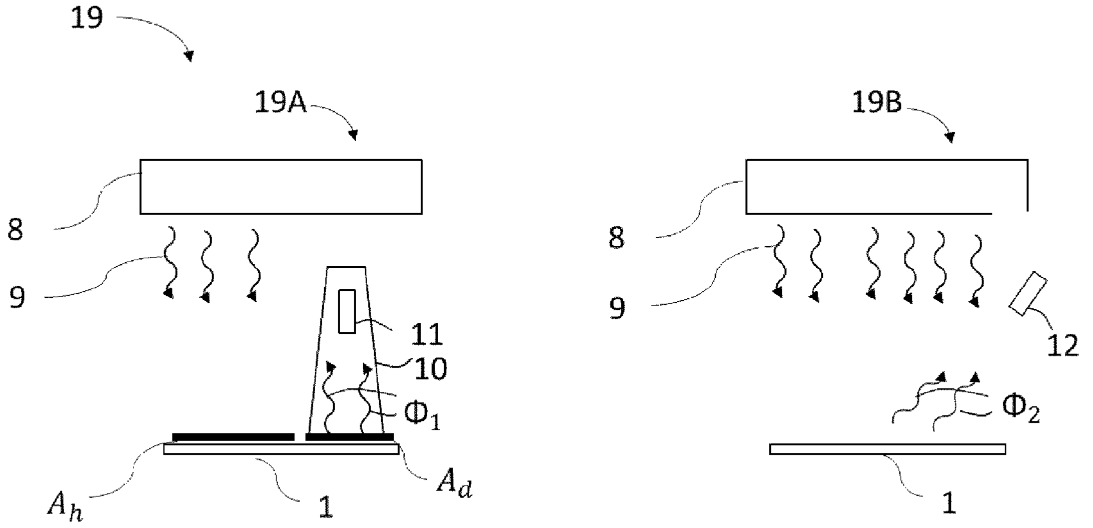
FIG. 7 shows a third measurement configuration of a device for assessing the quality of solar cells.
Figure 8:
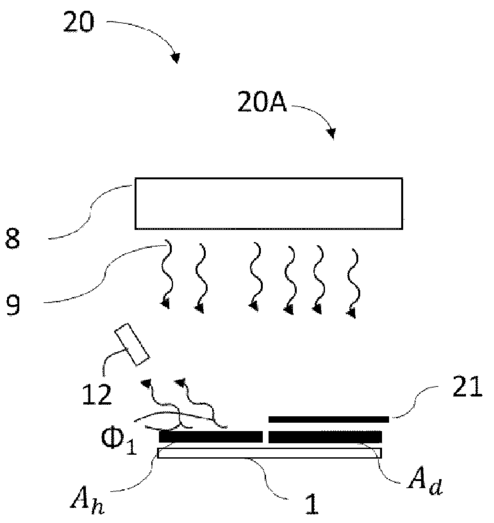
FIG. 8 shows a fourth measurement configuration of a device for assessing the quality of solar cells.

FIG. 7 shows a measurement configuration 19, in which the first luminescence measurement and the second luminescence measurement are carried out in a first sub-configuration 19A and a second sub-configuration 19B, respectively.

In terms of its set-up, the first sub-configuration 19A has a high degree of similarity to the measurement configuration 7 in accordance with FIG. 3. In contrast to the measurement configuration 7, the first sub-configuration 19A has only one InGaAs photodiode 11, which is arranged in the truncated cone 10. A current flow is generated as a result of excitation radiation 9 impinging on the solar cell 1 and leads to luminescence of the solar cell in the sub-area $A_d$ shaded by the truncated cone. An area ratio f arises in relation to the total area of the solar cell. The first intensity of the luminescence $\phi_1$ is measured by the InGaAs photodiode 11.

After the measurement of the first intensity $\phi_1$, the truncated cone 10 together with the InGaAs photodiode 11 is removed and replaced by the second InGaAs photodiode 12. This results in measurement configuration 19B. In the latter, excitation radiation 9 impinges on the solar cell 1 over the whole area and thus illuminates it homogeneously. The second intensity $\phi_2$ of the luminescent radiation generated in the process is measured by the second InGaAs photodiode 12.

The current density of the current and the voltage of the current density-voltage characteristic curve can be determined as a function of the measured first intensity and the second intensity according to the relationship in accordance with equation (41).

$$j(V=V_t*\ln[\phi_1/C]+f*V_t*\ln[\phi_2/\phi_1-(1-f)/f])=-j_{sc}*\phi_1/\phi_2*(1-f)/f \qquad \text{equation (41)}$$

Analogously to the explanation regarding equation (40), the short-circuit current density $j_{sc}$ (also called generation current density $j_{gen}$) can correspond to an estimated value or can be determined by means of an additionally implemented reflection measurement (not shown). Given areas $A_h$ and $A_d$ that are equal in magnitude, the area ratio fin accordance with equation (41) is 0.5.

FIG. 8 shows a different measurement configuration 20, in which the first luminescence measurement and the second luminescence measurement are effected in a third sub-configuration 20A and a fourth sub-configuration 20B, respectively.

In terms of its set-up, the third sub-configuration 20A likewise has a high degree of similarity to the measurement configuration 7 in accordance with FIG. 3. In contrast to the measurement configuration 7, the third sub-configuration 20A has only one InGaAs photodiode 12, which is arranged in an illuminated region of the solar cell impinged on inhomogeneously by excitation radiation.

In the third sub-configuration 20A, the solar cell is shaded by means of a shadow mask 21 in one region.

A current flow is generated as a result of the solar cell 1 being impinged on by excitation radiation 9 and leads to luminescence of the solar cell in the sub-area $A_h$. The first intensity of the luminescence $\phi_1$ is measured by the InGaAs photodiode 12.

In the fourth sub-configuration 20B, the shadow mask 20 is removed and the solar cell is impinged on homogeneously by excitation radiation 9 by means of the illumination device 8. In this case, the second intensity $\phi_2$ can be measured in an arbitrary region of the solar cell.

For calculating the current density and the voltage, the relationship in accordance with equation (42) holds true.

$$j(V=V_t*\ln[\phi_1/C]+(1-f)*V_t*\ln[f/(1-f)*(1+\phi_2/\phi_1)])=-j_{sc}*[1-\phi_1/\phi_2] \qquad \text{equation (42)}$$

Independently of the exemplary embodiments shown, the measurement principles described in FIGS. 1-8 can be repeated with variation of the parameters in accordance with which the excitation radiation is generated.

This allows the determination of a plurality of current densities and voltages at a corresponding plurality of operating points, besides the described determination of one current density and one voltage at one operating point.

As a result, at least one current density-voltage characteristic curve can be determined. In addition, at least one reflection measurement can be carried out besides the first and second luminescence measurements. In combination with a determinable wavelength-dependent reflectance in the form of a spectral reflection, it is possible to determine the generation current density $j_{gen}$ and also further quality characteristic variables of the solar cell.

The invention claimed is:

1. A method for contactlessly assessing a quality of a solar cell, the method comprising:

carrying out a first luminescence measurement in which a first sub-region of the solar cell is impinged on by excitation radiation in accordance with a first set of parameters and a second sub-region of the solar cell is impinged on by excitation radiation in accordance with a second set of parameters, which is different than the first set of parameters, and measuring a first intensity of luminescent radiation emitted by the solar cell in the first sub-region or the second sub-region;

carrying out at least one second luminescence measurement in which a second intensity of luminescent radiation emitted by the solar cell is measured; and in accordance with an alternative A, impinging the first sub-region of the solar cell by excitation radiation in accordance with the first set of parameters and impinging the second sub-region of the solar cell by excitation radiation in accordance with a third set of parameters, which is different than the first set of parameters, and measuring the second intensity in the one of the first or second sub-region in which the first intensity is not measured in the first luminescence measurement, or in accordance with an alternative B, impinging the solar cell homogeneously by excitation radiation in the first and second sub-regions in accordance with a fourth set of parameters and measuring the second intensity in at least one of the first sub-region or the second sub-region and, in an evaluation step, determining quality information depending on the first intensity and the second intensity.

2. The method as claimed in claim 1, wherein the first luminescence measurement comprises a first individual measurement, in which the first intensity is measured spatially independently in the first or the second sub-region, and the second luminescence measurement comprises a second individual measurement, in which the second intensity is measured spatially independently and, in accordance with alternative A, is measured in the one of the first or second sub-region in which the first intensity was not measured, or, in accordance with alternative B, is measured in the at least one of the first sub-region or the second sub-region, and the first intensity and the second intensity are each present as a spatially independent intensity value and the quality information is determined as spatially independent quality information regarding the entire solar cell.

3. The method as claimed in claim 1, wherein er 2, the first set of parameters comprises a first illumination intensity and at least one of the second, third, or fourth set(s) of parameters each comprise(s) at least one second illumination intensity and the first illumination intensity is different than the second illumination intensity, the first illumination intensity is 0 watt per square meter, such that the first sub-region in the first luminescence measurement and the second luminescence measurement in accordance with alternative A is not illuminated, and the second illumination intensity is greater than 30 watts per square meter.

4. The method as claimed in claim 1, wherein the evaluation step involves determining at least one of a current density or a voltage at an operating point of the solar cell, and the current density and the voltage are dependent on at least one of the first intensity or the second intensity.

5. The method as claimed in claim 4, wherein the at least one of the current density or the voltage is determined depending on a first area ratio, which is dependent on a ratio between an area of the first sub-region impinged on by excitation radiation or an area of the second sub-region impinged on by excitation radiation and a quality-relevant total area of the solar cell.

6. The method as claimed in claim 5, wherein the first sub-region comprises at least one first strip and the second sub-region comprises at least one second strip, and at least the first or the second strip is produced by projection owing to the impingement of excitation radiation on the solar cell.

7. The method as claimed in claim 5, wherein a total area of the solar cell and the area of the first sub-region and the area of the second sub-region are measured by an optical measuring device, and the current density is converted into a current intensity, and the power density is converted into a power.

8. The method as claimed in claim 7, further comprising at the latest after the first and second luminescence measurements, carrying out at least one of a parameter variation or an area variation, and carrying out at least one third luminescence measurement in addition to the first and second luminescence measurements, measuring a third intensity of luminescent radiation emitted by the solar cell, and the third luminescence measurement is carried out according to the first luminescence measurement or the second luminescence measurement in accordance with alternative A or B, and the third luminescence measurement is carried out with a fifth set of parameters, which is different than in at least one of the first or the second luminescence measurement, or a second area ratio, and the evaluation step involves determining a current density profile.

9. The method as claimed in claim 8, wherein the parameter variation comprises at least one intensity variation, such that the fifth set of parameters differs from at least one set of parameters of at least one of the first or second luminescence measurement in terms of at least one intensity, such that a series resistance-free Suns-$V_{oc}$ characteristic curve is at least partly determined and an area-related series resistance of the solar cell is determined depending on the first intensity and the second or third intensity and a current-voltage characteristic curve is determined depending on the series resistance and the series resistance-free Suns-$V_{oc}$ characteristic curve.

10. The method as claimed in claim 1, further comprising in addition to the first and second luminescence measurements, performing a contactless reflection measurement on the solar cell by impinging the solar cell by excitation radiation having a plurality of wavelengths and measuring radiation reflected by the solar cell, depending on which radiation determining a wavelength-dependent reflectance or a spectral reflection, and, in the evaluation step, determining the quality information depending on the first intensity, the second intensity and the spectral reflection.

11. The method as claimed in claim 10, wherein in the evaluation of the quality information, a mathematical model is adapted to the spectral reflection by a parameterization and a wavelength-dependent generation proportion of the excitation radiation incident on the solar cell is calculated and the wavelength-dependent generation proportion is subjected to mathematical convolution with an excitation spectrum and a generation current density is determined therefrom.

12. The method as claimed in claim 11, wherein in the reflection measurement, at least one of a) the excitation radiation is generated or b) the reflected radiation is captured at least partly by an Ulbricht sphere and a spectrometer captures at least the reflected radiation and outputs a spectral reflection, which is subjected to mathematical convolution with an excitation spectrum of the excitation radiation in the evaluation step in order to determine a reflected photon flux, such that the quality information is dependent on the reflected photon flux.

13. The method as claimed in any of claims 10 to 12, claim 10, wherein in the reflection measurement, the excitation radiation is generated at least partly by a diode, and an optical measuring device captures the reflected radiation, with which reflected radiation a spectral reflection is determined, and determines a reflected photon flux by a calibration of the optical measuring device.

14. The method as claimed in claim 8, further comprising in addition to the first and second luminescence measurements, performing a contactless reflection measurement on the solar cell by impinging the solar cell by excitation radiation having a plurality of wavelengths and measuring radiation reflected by the solar cell, depending on which radiation determining a wavelength-dependent reflectance or a spectral reflection, and, in the evaluation step, determining the quality information depending on the first intensity, the second intensity and the spectral reflection; and the parameter variation comprises at least one wavelength variation, such that the fifth set of parameters in the third luminescence measurement is different than at least one set of parameters of the first and second luminescence measurements in terms of at least one wavelength, and the evaluation step involves calculating a wavelength-dependent absolute internal quantum efficiency depending on a relative external quantum efficiency and the spectral reflection, wherein for at least one varied wavelength, a value for the absolute internal quantum efficiency is predefined and the absolute external quantum efficiency is ascertained, and a generation current density is determined depending on said absolute external quantum efficiency.

15. The method as claimed in claim 1, wherein the evaluation of the quality information in the evaluation step uses at least one of a model equation or a prediction model in order to determine the quality information.

16. A device for contactlessly assessing a quality of a solar cell, the device comprising:

a first measurement configuration and a second measurement configuration;

the first measurement configuration is adapted to shade a first sub-region of the solar cell or, via a radiation source, to cause excitation radiation to impinge on said first sub-region in accordance with a first set of parameters and to cause excitation radiation to impinge on a second sub-region of the solar cell in accordance with a second set of parameters, which is different than the first set of parameters, and, a detector device configured to measure a first intensity of luminescent radiation emitted by the solar cell in the first sub-region or in the second sub-region;

the second measurement configuration is adapted, via the radiation source, to cause excitation radiation to impinge on the second sub-region of the solar cell in accordance with a third set of parameters, which is different than the first set of parameters, and to shade the first sub-region of the solar cell or to cause excitation radiation to impinge on said first sub-region in accordance with the first set of parameters and, the detector device is further configured to measure a second intensity in the respective other sub-region relative to the first measurement configuration, or the second measurement configuration is adapted via the radiation source, to cause excitation radiation to impinge homogeneously on the solar cell in the first and second sub-regions in accordance with a fourth set of parameters, and the detector device is further configured to measure the second intensity in at least one of the first sub-region or the second sub-region; and the detector device is in communication with a computing unit, and the computing unit is configured to determine quality information depending on the first intensity and the second intensity.

* * * * *